(12) United States Patent
 Shin

(10) Patent No.: US 10,970,826 B2
(45) Date of Patent: Apr. 6, 2021

(54) METHOD AND DEVICE FOR IMAGE CORRECTION IN RESPONSE TO PERSPECTIVE

(71) Applicants: D RECTION, INC., Seoul (KR); Dong-Yun Shin, Gyeonggi-do (KR)

(72) Inventor: Dong-Yun Shin, Gyeonggi-do (KR)

(73) Assignees: D RECTION, INC., Seoul (KR); Dong-Yun Shin, Yongin-Si (KR)

(*) Notice: Subject to any disclaimer, the term of this patent is extended or adjusted under 35 U.S.C. 154(b) by 6 days.

(21) Appl. No.: 16/608,727

(22) PCT Filed: Apr. 26, 2018

(86) PCT No.: PCT/KR2018/004876
§ 371 (c)(1),
(2) Date: Oct. 25, 2019

(87) PCT Pub. No.: WO2018/199663
PCT Pub. Date: Nov. 1, 2018

(65) Prior Publication Data
US 2021/0012471 A1  Jan. 14, 2021

(30) Foreign Application Priority Data
Apr. 26, 2017 (KR) .................. 10-2017-0053983

(51) Int. Cl.
*G06T 5/00* (2006.01)
*G06T 3/00* (2006.01)
(Continued)

(52) U.S. Cl.
CPC .............. *G06T 5/006* (2013.01); *G06T 3/00* (2013.01); *G06T 5/50* (2013.01); *G06T 7/60* (2013.01);
(Continued)

(58) Field of Classification Search
CPC combination set(s) only.
See application file for complete search history.

(56) References Cited

U.S. PATENT DOCUMENTS

2007/0291473 A1* 12/2007 Traynor ................... B60Q 7/00
  362/106
2014/0285523 A1*  9/2014 Gruenler ............... G06T 19/006
  345/633
(Continued)

FOREIGN PATENT DOCUMENTS

KR    101060152 B1    8/2011
KR    101261409 B1    5/2013
(Continued)

OTHER PUBLICATIONS

International Search Report for application No. PCT/KR2018/004876, dated Aug. 20, 2018.

*Primary Examiner* — Wesner Sajous
(74) *Attorney, Agent, or Firm* — Moser Taboada

(57) ABSTRACT

One embodiment of the invention provides an image correction method comprising: providing a first image; providing a first image; providing viewpoint information about a viewpoint which observes the first image; dividing the first image into two or more segmented images along a horizontal direction of the first image; and providing a second image converted from the first image by converting each of the two or more segmented images based on the viewpoint information and vertical lengths of each of the segmented images.

14 Claims, 13 Drawing Sheets

(51) Int. Cl.
*G06T 5/50* (2006.01)
*G06T 7/60* (2017.01)
*G06K 9/00* (2006.01)

(52) U.S. Cl.
CPC .............. *G06T 2207/20021* (2013.01); *G06T 2207/30256* (2013.01)

(56) References Cited

U.S. PATENT DOCUMENTS

2018/0101739 A1* 4/2018 Zhang ................ G06K 9/00805
2020/0012097 A1* 1/2020 Kubota ................... G09G 5/38

FOREIGN PATENT DOCUMENTS

| KR | 1020160028302 A | 3/2016 |
| KR | 101645717 B1 | 8/2016 |
| WO | WO-2004008744 A1 | 1/2004 |

\* cited by examiner

FIG. 3
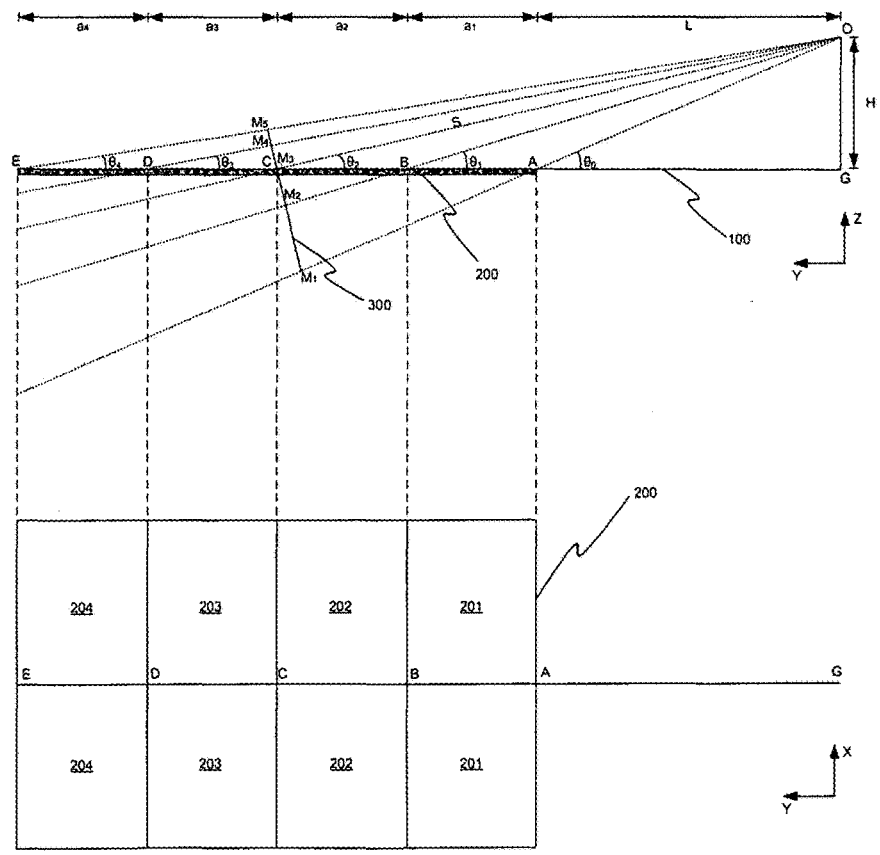
FIG. 4a
FIG. 4b

FIG. 10b

And so on.

METHOD AND DEVICE FOR IMAGE CORRECTION IN RESPONSE TO PERSPECTIVE

TECHNICAL FIELD

The present invention relates to a perspective-adaptive image correction method and an apparatus for performing the method. More particularly, the present invention relates to an image correction method and apparatus capable of transforming a given subject image to provide improved legibility for the subject image.

BACKGROUND ART

FIG. 1 shows an example of a conventional road marking.

Road markings refer to any signs that are marked on the road surface using paint, coating material, and the like for safe driving and a smooth flow of traffic. Its contents range from signs on norms of vehicle operation such as centerlines and pedestrian crossings to descriptive signs such as 'go slow in front of school' and 'children protection zone.'

These road markings can provide a variety of information, such as information on driving or caution required for traffic safety, and are currently used a lot on driving roads.

However, when a driver looks at the road markings on the road from the vehicle, distortion may be caused by perspective according to the driver's viewing angle or distance from the road markings. In particular, as the distance from an observation point increases, the width of an image, especially the vertical width gradually narrows, and visual distortion may occur. Therefore, there is a problem that the legibility of the road markings gets worse due to the visual distortion.

In particular, in the case of Korean road markings, the structure of the text image is more complicated because it uses final consonants, aspirated consonants, and the like when compared to the alphabet. As a result, drivers may misread or be unable to read the road markings from a long-distance due to the visual distortion caused by perspective. This issue can occur in single-row road markings but more often in two-rows or more road markings.

To solve this problem, in the conventional art, it was common to secure legibility by increasing only the length (vertical width) of the road markings along the direction of the driver's view.

However, in many cases, road markings are adjusted by the subjective judgment criteria and convenience of operators. Thus, the improvement of legibility has been insufficient and inconsistent.

In particular, in the conventional art, since only the length of the road markings was increased in the same proportion along the direction of the driver's view, there was still a problem that the thickness of the horizontal line located far from the driver looked thin and that of the horizontal line located close the driver looked thick. Therefore, it may be challenging to grasp the meaning of the road markings instantly in a fast-moving car, which may eventually lead to a threat to safety.

This problem is not limited to the road markings. This problem can also occur in the Street view, which is widely used in portal sites. FIG. 3 is a screenshot of Google Street View. On the screen, the text "Meadowlands Pkwy" is added on Google Street View through computer work to display the street name. However, as a result of applying perspective to provide a more realistic sense to a Street View user, it can be seen from the figure that the legibility deteriorates as the distance from the viewpoint increases.

The above matters are described schematically with reference to FIG. 2.

FIG. 2a shows a perspective view of a ground surface seen from a viewpoint located at a certain height from the ground surface. Lines HL are horizontal lines arranged parallel to each other at equal intervals, and lines VL are vertical lines arranged parallel to each other at equal intervals, each line VL being orthogonal to each line HL.

However, as shown, looking down at the ground surface from a distance, vertical lines VL appear to converge toward a vanishing point at infinity due to perspective so that the distance between neighboring vertical lines seems to be narrower as they are farther away from the viewpoint. The distance between neighboring horizontal lines HL also seems to be closer as they are farther away from the viewpoint. Thus, for example, assuming that letters or symbols are arranged in the same size within each rectangular tile 10 of FIG. 2, it can be seen that the legibility will deteriorate further as they are farther away from the viewpoint.

Besides, in computer games (e.g., racing games), Augmented Reality (AR), Virtual Reality (VR), and the like, a problem that deteriorates the legibility may occur when the characters or symbols are expressed by applying perspective.

FIG. 2b shows a space including four surfaces of a top surface, a bottom surface, a left side surface, and a right side surface. In the case of VR or AR, graphics may be created not only on the bottom surface as in the example of the road markings, but graphics may also be created on at least one of the left side surface, the right side surface, and the top surface. Even in this case (for example, when letters are created on the left side surface), it can be seen from FIG. 2b that distortion due to perspective may occur.

Therefore, in generating a variety of images, such as the road markings, which are displayed on a surface and provide predetermined information, there is a need for an image generating apparatus capable of providing a consistent and accessible image correction and improved legibility while being in harmony with the surrounding environment and a method of operating the same.

Meanwhile, to solve the above problems, Korean Patent No. 10-1668802 discloses a method of operating a long-range discernible image generating apparatus.

Specifically, the above patent discloses a method of operating a long-range discernible image generating apparatus, wherein the method comprises:

(a) providing a first image including at least one character;

(b) creating a second image which has proportions of the first image altered by reflecting predetermined viewpoint information for the first image and applying inverse perspective—the viewpoint information including information on at least one of a direction of view and an angle of view for the first image;

(c) extracting coordinates for a first reference point of the first image and coordinates for a second reference point of the second image corresponding to the first reference point, wherein the coordinates of the first reference point are extracted based on at least one of the character; and (d) converting the first image by comparing at least one value of the coordinates of the first reference point and at least one value of the coordinates of the second reference point corresponding to the first reference point and magnifying or reducing at least a part of a reference area partitioned by the first reference point along the direction of view, (e) wherein creating the second image comprises converting the first image into a 3D image and creating the second image by rotating the 3D-converted first image at a predetermined rotational angle toward the direction of view around a predetermined rotary axis reflecting the viewpoint information and extracting a plane image.

However, the method requires converting the first image into the 3D image, rotating it around the rotational axis, and then extracting the planar image and extracting the coordinates for the first reference point of the first image and the second reference point of the second image.

DISCLOSURE

Technical Problem

The present invention is contrived to solve the above problems and has been made to provide an image correction method and apparatus that can provide a consistent and accessible image correction and at the same time provide improved legibility, without the process of rotating an image or the process of extracting a separate reference point.

Technical Solution

According to an embodiment of the invention, there is provided an image correction method comprising: providing a first image; providing viewpoint information about a viewpoint which observes the first image; dividing the first image into two or more segmented images along a horizontal direction of the first image; and providing a second image converted from the first image by converting each of the two or more segmented images based on the viewpoint information and vertical lengths of each of the segmented images.

In another embodiment, the viewpoint information may comprise information that can specify a position of the viewpoint with respect to the first image.

In another embodiment, the viewpoint information may comprise at least two of a viewpoint height from a plane where the first image locates to the viewpoint; a viewpoint distance from a point at which the viewpoint projects on the plane where the first image locates to a viewpoint-facing end of the first image; a viewing angle at the viewpoint-facing end of the first image; a viewing angle at an opposite end of the first image; a length of line-of-sight from the viewpoint to the viewpoint-facing end of the first image; a length of line-of-sight from the viewpoint to the opposite end of the first image; and a viewpoint angle for the first image.

In another embodiment, providing the second image converted from the first image may comprise obtaining an apparent length of each segmented image based on the viewpoint information and the vertical lengths of each of the segmented images; and obtaining a conversion length for each segmented image from the apparent lengths.

In another embodiment, obtaining the conversion length for each segmented image from the apparent lengths may comprise obtaining the conversion length for each segmented image such that a ratio of a conversion length for an $i^{th}$ segmented image to an entire conversion length for the first image equals a ratio of an apparent length of an $(n-i+1)^{th}$ segmented image to an entire apparent length of the first image. Here, n is the total number of the segmented images.

In another embodiment, obtaining the conversion length for each segmented image from the apparent lengths may comprise obtaining a conversion length $y_i$ of an $i^{th}$ segmented image using a conversion equation below;

$$y_i = \frac{h_{n-i+1}}{\sum_{j=1}^{n} h_j} \times T.$$

Here, $h_i$ is an apparent length of the $i^{th}$ segmented image, n is the total number of the segmented images, and T is an entire length of the first image.

In another embodiment, obtaining the apparent length may comprise obtaining the apparent length through an equation for calculating the apparent length. The equation for calculating an apparent length $h_i$ for an $i^{th}$ segmented image can be as follows;

$$h_i = S \times \{\tan(\theta_{i-1} - \theta_f) - \tan(\theta_i - \theta_f)\}.$$

Here, S is a length of line-of-sight from the viewpoint to a focal point, $\theta_i$ is a viewing angle at an opposite end of the $i^{th}$ segmented image, $\theta_0$ is a viewing angle at a viewpoint-facing end of a first segmented image, and $\theta_f$ is a viewing angle at the focal point.

In another embodiment, obtaining the apparent length may comprise obtaining the apparent length through an equation for calculating the apparent length. The equation for calculating an apparent length $h_i$ for an $i^{th}$ segmented image can be as follows;

$$h_i = R \times \tan(\theta_{i-1} - \theta_i).$$

Here, R is a length of line-of-sight from the viewpoint to a viewpoint-facing end of the first image, $\theta_i$ is a viewing angle at an opposite end of the $i^{th}$ segmented image, $\theta_0$ is a viewing angle at a viewpoint-facing end of a first segmented image.

In another embodiment, providing the second image converted from the first image may comprise obtaining a viewpoint angle for each of the segmented images based on the viewpoint information and the vertical lengths of each of the segmented images; and obtaining a conversion length for each segmented image from the viewpoint angles.

In another embodiment, obtaining the viewpoint angle for each of the segmented images may comprise obtaining the viewpoint angle such that a ratio among the viewpoint angles for each segmented image and a ratio among the vertical lengths of each segmented image are equal to each other.

In another embodiment, obtaining the viewpoint angle for each segmented image may comprise obtaining a viewpoint angle $\alpha_i$ for an $i^{th}$ segmented image using a conversion equation below;

$$\alpha_i = (\theta_0 - \theta_n) \times \left(\frac{a_i}{T}\right).$$

Here, T is an entire length of the first image, n is the total number of the segmented images, $a_i$ is a vertical length of the $i^{th}$ segmented image, $\theta_0$ is a viewing angle at a viewpoint-facing end of a first segmented image, and $\theta_n$ is a viewing angle at an opposite end of an $n^{th}$ segmented image.

In another embodiment, obtaining the conversion length for each segmented image may comprise obtaining a conversion length $y_i$ of the $i^{th}$ segmented image using a conversion equation below;

$$y_i = \frac{H}{\tan\left(\theta_0 = \sum_{j=1}^{i} \alpha_j\right)} - \left(L + \sum_{j=1}^{i-1} y_j\right).$$

Here, H is a viewpoint height from a plane where the first image locates to the viewpoint, and L is a viewpoint distance from a point at which the viewpoint projects on the plane where the first image locates to a viewpoint-facing end of the first image.

According to an embodiment of the invention, there is provided a computer-readable memory comprising computer-readable instructions, wherein the instructions, when executed on a computer, cause the computer to perform the operations of: providing a first image; providing viewpoint information about a viewpoint which observes the first image; dividing the first image into two or more segmented images along a horizontal direction of the first image; and providing a second image converted from the first image by converting each of the two or more segmented images based on the viewpoint information and vertical lengths of each of the segmented images.

In another embodiment, the viewpoint information may comprise information that can specify a position of the viewpoint with respect to the first image.

In another embodiment, the viewpoint information may comprise at least two of a viewpoint height from a plane where the first image locates to the viewpoint; a viewpoint distance from a point at which the viewpoint projects on the plane where the first image locates to a viewpoint-facing end of the first image; a viewing angle at the viewpoint-facing end of the first image; a viewing angle at an opposite end of the first image; a length of line-of-sight from the viewpoint to the viewpoint-facing end of the first image; a length of line-of-sight from the viewpoint to the opposite end of the first image; and a viewpoint angle for the first image.

In another embodiment, providing the second image converted from the first image may comprise obtaining an apparent length of each segmented image based on the viewpoint information and the vertical lengths of each of the segmented images; and obtaining a conversion length for each segmented image from the apparent lengths.

In another embodiment, obtaining the conversion length for each segmented image from the apparent lengths may comprise obtaining the conversion length for each segmented image such that a ratio of a conversion length for an $i^{th}$ segmented image to an entire conversion length for the first image equals a ratio of an apparent length of an $(n-i+1)^{th}$ segmented image to an entire apparent length of the first image. Here, n is the total number of the segmented images.

In another embodiment, obtaining the conversion length for each segmented image from the apparent lengths may comprise obtaining a conversion length $y_i$ of an $i^{th}$ segmented image using a conversion equation below;

$$y_i = \frac{h_{n-i+1}}{\sum_{j=1}^{n} h_j} \times T.$$

Here, $h_i$ is an apparent length of the $i^{th}$ segmented image, n is the total number of the segmented images, and T is an entire length of the first image.

In another exemplary embodiment, obtaining the apparent length may comprise obtaining the apparent length through an equation for calculating the apparent length. The equation for calculating an apparent length $h_i$ for an $i^{th}$ segmented image can be as follows;

$$h_i = S \times \{\tan(\theta_{i-1} - \theta_f) - \tan(\theta_i - \theta_f)\}.$$

Here, S is a length of line-of-sight from the viewpoint to a focal point, $\theta_1$ is a viewing angle at an opposite end of the $i^{th}$ segmented image, $\theta_0$ is a viewing angle at a viewpoint-facing end of a first segmented image, and $\theta_f$ is a viewing angle at the focal point.

In another embodiment, obtaining the apparent length may comprise obtaining the apparent length through an equation for calculating the apparent length. The equation for calculating an apparent length $h_1$ for an $i^{th}$ segmented image can be as follows;

$$h_i = R \times \tan(\theta_{i-1} - \theta_i).$$

Here, R is a length of line-of-sight from the viewpoint to a viewpoint-facing end of the first image, $\theta_1$ is a viewing angle at an opposite end of the $i^{th}$ segmented image, $\theta_0$ is a viewing angle at a viewpoint-facing end of a first segmented image.

In another embodiment, providing the second image converted from the first image may comprise obtaining a viewpoint angle for each of the segmented images based on the viewpoint information and the vertical lengths of each of the segmented images; and obtaining a conversion length for each segmented image from the viewpoint angles.

In another embodiment, obtaining the viewpoint angle for each of the segmented images may comprise obtaining the viewpoint angle such that a ratio among the viewpoint angles for each segmented image and a ratio among the vertical lengths of each segmented image are equal to each other.

In another embodiment, obtaining the viewpoint angle for each segmented image may comprise obtaining a viewpoint angle $\alpha_i$ for an $i^{th}$ segmented image using a conversion equation below;

$$\alpha_i = (\theta_0 - \theta_n) \times \left(\frac{a_i}{T}\right).$$

Here, T is an entire length of the first image, n is the total number of the segmented images, $a_i$ is a vertical length of the $i^{th}$ segmented image, $\theta_0$ is a viewing angle at a viewpoint-facing end of a first segmented image, and $\theta_n$ is a viewing angle at an opposite end of an $n^{th}$ segmented image.

In another embodiment, obtaining the conversion length for each segmented image may comprise obtaining a conversion length $y_i$ of the $i^{th}$ segmented image using a conversion equation below;

$$y_i = \frac{H}{\tan\left(\theta_0 = \sum_{j=1}^{i} \alpha_j\right)} - \left(L + \sum_{j=1}^{i-1} y_j\right).$$

Here, H is a viewpoint height from a plane where the first image locates to the viewpoint, and L is a viewpoint distance from a point at which the viewpoint projects on the plane where the first image locates to a viewpoint-facing end of the first image.

According to an embodiment of the present invention, there is provided an image correction apparatus comprising: an input unit configured to input a first image and viewpoint information about a viewpoint which observes the first image; and an image conversion unit configured to divide the first image into two or more segmented images along a horizontal direction of the first image and convert the first image to a second image by converting each of the two or more segmented images based on the viewpoint information and vertical lengths of each of the segmented images.

In another embodiment, the image correction apparatus may further comprise an output unit configured to output the converted second image.

In another embodiment, the viewpoint information may comprise information that can specify a position of the viewpoint with respect to the first image.

In another embodiment, the viewpoint information may comprise at least two of a viewpoint height from a plane where the first image locates to the viewpoint; a viewpoint distance from a point at which the viewpoint projects on the plane where the first image locates to a viewpoint-facing end of the first image; a viewing angle at the viewpoint-facing end of the first image; a viewing angle at an opposite end of the first image; a length of line-of-sight from the viewpoint to the viewpoint-facing end of the first image; a length of line-of-sight from the viewpoint to the opposite end of the first image; and a viewpoint angle for the first image.

In another embodiment, the image conversion unit may further be configured to obtain an apparent length of each segmented image based on the viewpoint information and the vertical lengths of each of the segmented images; and obtain a conversion length for each segmented image from the apparent lengths.

In another embodiment, the image conversion unit may further be configured to obtain the conversion length for each segmented image such that a ratio of a conversion length for an $i^{th}$ segmented image to an entire conversion length for the first image equals a ratio of an apparent length of an $(n-i+1)^{th}$ segmented image to an entire apparent length of the first image. Here, n is the total number of the segmented images.

In another embodiment, the image conversion unit may further be configured to obtain a conversion length $y_i$ of an $i^{th}$ segmented image using a conversion equation below;

$$y_i = \frac{h_{n-i+1}}{\sum_{j=1}^{n} h_j} \times T.$$

Here, $h_i$ is an apparent length of the $i^{th}$ segmented image, n is the total number of the segmented images, and T is an entire length of the first image.

In another embodiment, the image conversion unit may further be configured to obtain the apparent length through an equation for calculating the apparent length. The equation for calculating an apparent length $h_i$ for an $i^{th}$ segmented image can be as follows;

$$h_i = S \times \{\tan(\theta_{i-1} - \theta_f) - \tan(\theta_i - \theta_f)\}.$$

Here, S is a length of line-of-sight from the viewpoint to a focal point, $\theta_i$ is a viewing angle at an opposite end of the $i^{th}$ segmented image, $\theta_0$ is a viewing angle at a viewpoint-facing end of a first segmented image, and $\theta_f$ is a viewing angle at the focal point.

In another embodiment, the image conversion unit may further be configured to obtain the apparent length through an equation for calculating the apparent length. The equation for calculating an apparent length $h_i$ for an $i^{th}$ segmented image can be as follows;

$$h_i = R \times \tan(\theta_{i-1} - \theta_i).$$

Here, R is a length of line-of-sight from the viewpoint to a viewpoint-facing end of the first image, $\theta_i$ is a viewing angle at an opposite end of the $i^{th}$ segmented image, $\theta_0$ is a viewing angle at a viewpoint-facing end of a first segmented image.

In another embodiment, the image conversion unit may further be configured to convert the first image to the second image by obtaining a viewpoint angle for each of the segmented images based on the viewpoint information and the vertical lengths of each of the segmented images; and obtaining a conversion length for each segmented image from the viewpoint angles.

In another embodiment, the image conversion unit may further be configured to obtain the viewpoint angle for each of the segmented images such that a ratio among the viewpoint angles for each segmented image and a ratio among the vertical lengths of each segmented image are equal to each other.

In another embodiment, the image conversion unit may further be configured to obtain a viewpoint angle $\alpha_i$ for an $i^{th}$ segmented image using a conversion equation below;

$$\alpha_i = (\theta_0 - \theta_n) \times \left(\frac{a_i}{T}\right).$$

Here, T is an entire length of the first image, n is the total number of the segmented images, $a_i$ is a vertical length of the $i^{th}$ segmented image, $\theta_0$ is a viewing angle at a viewpoint-facing end of a first segmented image, and $\theta_n$ is a viewing angle at an opposite end of an $n^{th}$ segmented image.

In another embodiment, the image conversion unit may further be configured to obtain a conversion length $y_i$ of the $i^{th}$ segmented image using a conversion equation below;

$$y_i = \frac{H}{\tan\left(\theta_0 = \sum_{j=1}^{i} \alpha_j\right)} - \left(L + \sum_{j=1}^{i-1} y_j\right).$$

Here, H is a viewpoint height from a plane where the first image locates to the viewpoint, and L is a viewpoint distance from a point at which the viewpoint projects on the plane where the first image locates to a viewpoint-facing end of the first image.

Advantageous Effects

According to the image correction method and apparatus provided in the present invention, it is possible to improve the poor legibility due to perspective when viewing images from a distance.

Thus, when using the present invention to road markings, drivers can read the road markings at a farther distance. In other words, it is possible to shorten response time by the difference between distances where the drivers can read the road markings, and thus the drivers can make a quick judgment even during a high-speed movement. Also, it is possible to prevent passing by an exit at an intersection or traffic accidents due to risky cutting in line, both of which can be caused by poor legibility.

Besides, when used in a VR or AR system, it is possible to create an image with perspective while improving the legibility. Therefore, it becomes possible to implement a VR or AR system of a more comfortable environment.

Any other effect of the present invention becomes apparent from the entire description of the specification to a person having ordinary skill in the art to which the present invention pertains.

DESCRIPTION OF DRAWINGS

FIG. 3 is a screenshot of Google Street View.

FIG. 4 schematically illustrates an image correction method according to an embodiment of the present invention.

FIG. 10b shows the subject image and the converted image of FIG. 10a seen from a particular viewpoint.

DRAWINGS

Figure 1:
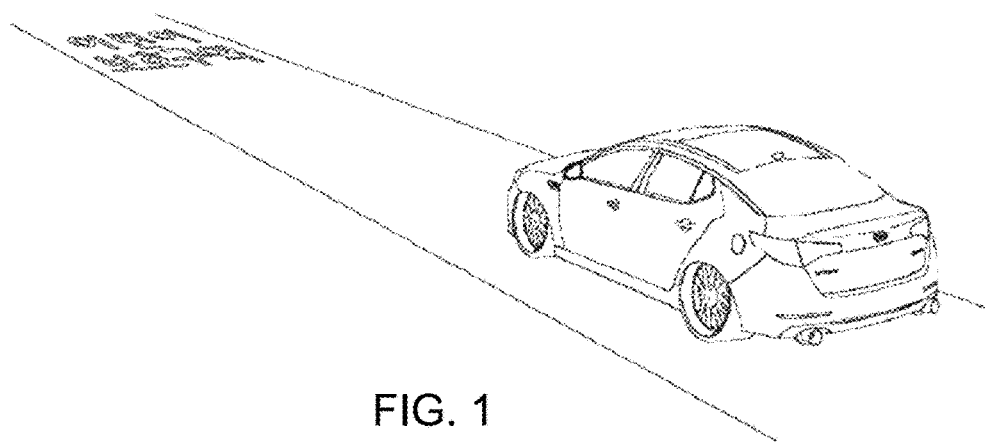
FIG. 1 shows an example of using a conventional road marking.
Figure 9A:
FIG. 9a shows a subject image and an image converted by the present invention.
Figure 9B:
FIG. 9b shows the subject image and the converted image of FIG. 9a viewed from a particular viewpoint.

It may be noted that in FIG. 1, the text in Korean language means "Children Protection Zone." Similarly, in the depiction of FIGS. 9a and 9b, the text in Korean language means "Children Protection Zone."

BEST MODE

From now on, image correction apparatus and methods according to embodiments of the present invention are described with reference to the accompanying drawings.

The following embodiments are part of the detailed description to aid in understanding the present invention and are not intended to limit the scope of the present invention. Therefore, any equivalent that performs the same functions as the present invention also falls within the scope of the present invention.

When reference numerals refer to components of each drawing, it is noted that although the same components are illustrated in different drawings, the same components are designated by the same reference numerals as possible. Also, in describing the present invention, when it is determined that the detailed description of the related well-known components or functions may obscure the gist of the present invention, the detailed description thereof is omitted.

Also, in describing the components of the present invention, terms, such as 1st, 2nd, A, B, (a), (b), and the like can be used. These terms are only for distinguishing a component from other components, and therefore nature, order, and the like of the components are not limited by the terms. Throughout this specification and the claims that follow, when it is described that a part is "coupled" or "connected" to another part, the part may be directly coupled or connected to the other part or indirectly coupled or connected to the other part through a third part. On the other hand, when it is described that a part is "directly coupled" or "directly connected" to another part, it should be understood that there is no other part therebetween. Other expressions describing the relationship between components, such as "between" and "immediately between," or "neighboring to," and "directly neighboring to," should be interpreted likewise.

Also, the terminology used herein is to describe particular embodiments only and is not intended to limit the scope of the present invention. As used herein, the singular forms "a," "an," and "the" are intended to include the plural forms, including "at least one," unless the context clearly indicates otherwise. It is to be understood that the terms "comprises," "includes," "has," and the like when used in this specification, specify the presence of stated features, numbers, steps, operations, components, parts, or combinations thereof, but do not preclude the presence or the addition of one or more other features, numbers, steps, operations, components, parts, or combinations thereof.

Unless otherwise defined, all terms (including technical and scientific terms) used herein have the same meaning as commonly understood by a person having ordinary skill in the art to which this disclosure belongs. It is further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

As used herein, the term "subject image" refers to an original image (first image) given before the conversion according to the method of the present invention be performed. The subject image may include, for example, signs or characters such as road markings (children protection zone, stop, slow down school zone, and the like) to be marked on road surfaces, or road markings to be used on a computer, such as Google Street View, characters or symbols to be used in Virtual Reality (VR) or Augmented Reality (AR), and the like, and any image that can be implemented in reality or on computer graphics.

As used herein, the term "converted image" refers to an image (second image) modified from a given subject image by a method of the present invention.

As used herein, the term "viewpoint-facing end" refers to a point, which is closest to a viewpoint, on the bottom side (a side closest to the viewpoint) of a rectangle, wherein each side of the rectangle corresponds to the top, bottom, leftmost and rightmost portions of a given image, respectively, such that the given image can be fit into the rectangle. As used herein, the term "opposite end" refers to a point, which is closest to the viewpoint, on the top side of the rectangle. For example, in FIG. 4, point A is the viewpoint-facing end of a subject image (or of the first split portion of the subject image), and point E is the opposite end of the subject image (or of the fourth split portion of the subject image).

Figure 2A:
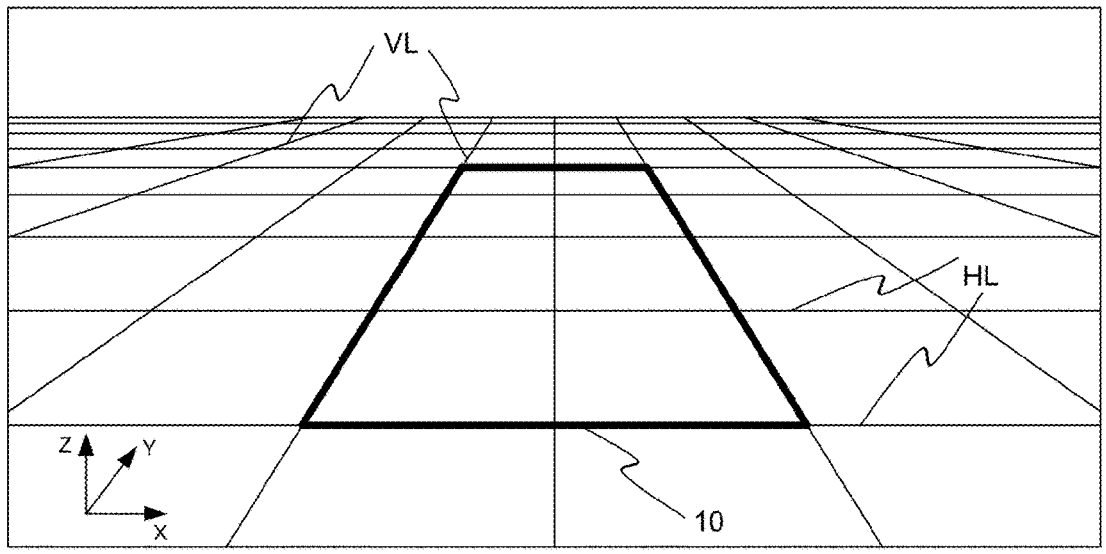
FIG. 2a shows a perspective view of a ground surface seen from a viewpoint located at a certain height from the ground surface.

In the present disclosure, the horizontal direction and the vertical direction are determined concerning the rectangle. For example, in FIGS. 2a and 2b lines HL are in the horizontal direction, and lines VL are in the vertical direction.

Figure 2B:
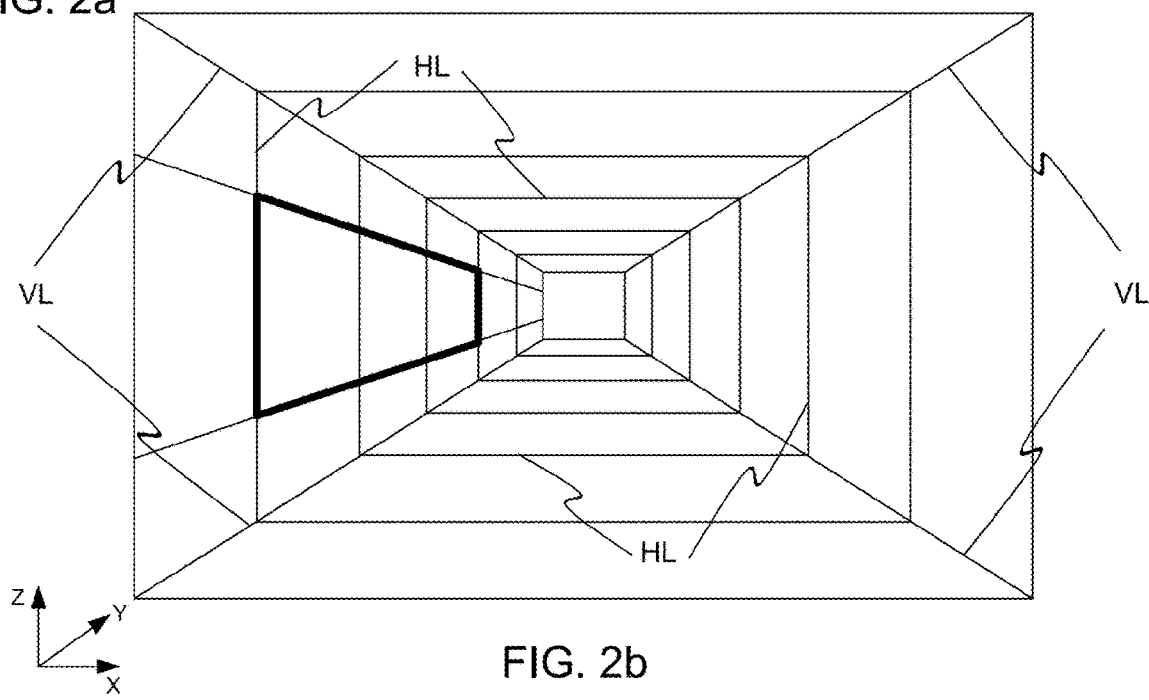
FIG. 2b shows a space viewed from a viewpoint on the space.

As used herein, the term "ground surface" refers to both a real surface on which a subject image is to be physically applied and a virtual surface on which a subject image is to be created by computer graphic works, and is not limited to a surface placed on the floor, but may include any surface such as a side or a ceiling surface. For example, when a virtual image is created on the left side, as shown in FIG. 2b, the left side can be a ground surface.

As used herein, the term "length of line-of-sight" refers to the distance from a viewpoint to a corresponding point. For example, in the embodiments described below, the length of the line segment OA, the length of the line segment OE, and the like can be lengths of line-of-sight.

As used herein, the term "apparent length" refers to a vertical length, which is observed at a viewpoint, from a viewpoint-facing end of a given image to an opposite end. In other words, "apparent length" is a vertical length from a viewpoint-facing end of a given image to an opposite end, which appears smaller than its actual length due to perspective when observed from the viewpoint. For example, the length of the line segment $M_1M_2$, $h_i$, and the like in the following embodiments can be apparent lengths.

As used herein, the term "viewing angle" refers to an angle being formed when viewing a viewpoint from a point on a ground surface. For example, in the embodiments described below, the viewing angle at point A is $\theta_0$, and the viewing angle at point C is $\theta_2$.

As used herein, the term "viewpoint angle" refers to an angle being formed between a viewpoint-facing end of an image to an opposite end of the image when viewing the image at a viewpoint. For example, in the embodiments described below, the viewpoint angle for the segmented image 201 is $\angle AOB$, and the viewpoint angle for the entire subject image 200 is $\angle AOE$.

As used herein, the term "viewpoint information" refers to information sufficient to enable the position of a viewpoint to be specified with respect to a subject image. For example, in FIG. 4, the viewpoint information includes a viewpoint distance L, a viewpoint height H, a viewing angle at a viewpoint-facing end of a subject image, a viewing angle at an opposite end of the subject image, a length of line-of-sight from the viewpoint to the viewpoint-facing end of the subject image, the length of line-of-sight from the viewpoint to the opposite end of the subject image, the viewpoint angle for the subject image, since the position of the viewpoint with respect to the subject image can be determined when at least two of the above information are known.

In the present disclosure, when indicating orders like the $i^{th}$, $j^{th}$, and the like, it is determined as the first, second, third, and so on from the viewpoint side.

The present invention proposes a method for converting a subject image, which is to be physically directly applied to the ground surface such as a road or virtually created with perspective by computer graphic works, to solve the problem that the legibility of the subject image is deteriorated due to perspective.

In a specific embodiment according to the present invention, a given subject image is horizontally divided into a predetermined number of segmented images, and the vertical length of the segmented image located closer to a viewpoint is relatively reduced, and the vertical length of the segmented image located farther from the viewpoint is relatively increased. Such conversion can improve the problem that the legibility of the subject image is deteriorated due to perspective while maintaining the overall vertical length of the subject image.

In another specific embodiment according to the present invention, a given subject image is divided horizontally into a predetermined number of segmented images, then the apparent length of each segmented image is obtained. Then, the ratio among these apparent lengths is inversely applied to each segmented image to obtain new vertical lengths (hereinafter, referred to as conversion lengths) to which the vertical lengths of the segmented images are to be converted. That is, in the case where the given subject image is divided into n segmented images, the conversion length for each segmented image is determined such that the ratio of the conversion length for the $i^{th}$ segmented image to the entire conversion length for the subject image equals the ratio of the apparent length of the $(n-i+1)^{th}$ segmented image to the entire apparent length of the subject image.

FIG. 4 is a diagram illustrating such a method according to an embodiment of the present invention. FIG. 4(b) is a plan view of a position where a subject image 200 can be arranged, and FIG. 4(a) schematically shows a cross-section taken along the line GE of FIG. 4(b).

In FIG. 4, reference numeral 100 represents a ground surface, and O represents a viewpoint. For example, the viewpoint may correspond to, but is not limited to, the eyes of a driver in a car. G represents a point on the ground surface 100 located vertically below the viewpoint O. The height of the viewpoint O (viewpoint height), that is, the length of the line segment OG is represented by H. L represents a distance (viewpoint distance) from a point where the viewpoint O projects on the ground surface (i.e., point G) to a viewpoint-facing end of the subject image 200 (i.e., point A).

Reference numeral 200 represents a rectangle, each side of which adjoins the uppermost, lowermost, leftmost, and rightmost portions of the subject image (for example, a road marking) to be created on the ground surface 100, respectively. Each of Reference numerals 201, 202, 203, and 204, which will be described later, also likewise represents a rectangle for a corresponding segmented image. Hereinafter, for convenience of description, these can be expressed simply in the manner of the subject image 200, the segmented image 201, and the like. Also, although the subject image 200 is illustrated as having a thickness below the ground surface 100 in the drawings, this is for convenience of description only. In practice, it is assumed that the subject image has no substantial thickness and is placed alongside the ground surface 100 on an extension thereof.

In the present embodiment, the subject image 200 is divided into four segmented images 201, 202, 203, and 204 in parallel along the horizontal direction (X-axis direction). Points A, B, C, D, and E represent positions where the horizontal lines of thus divided segmented images meet the line which passes through point G and is parallel to the Y-axis, respectively. Each of $a_1$, $a_2$, $a_3$, and $a_4$ represents the vertical lengths (lengths in the Y-axis direction) of the segmented images 201, 202, 203, and 204, respectively.

In the present embodiment and the following embodiments, the subject image 200 is divided into four segmented images, but this is just for the convenience of explanation. A person having ordinary skill in the art to which the present invention pertains will appreciate from the contents disclosed in the specification of the present invention that the more the subject image 200 is divided into numbers, the better the legibility will be.

Meanwhile, in the present embodiment, it is assumed that a focal point locates on point C. A focal-plane passing through the focal point is represented by 300 and is orthogonal to a line-of-sight OC at point C. The points where the focal-plane 300 and lines-of-sight OA, OB, OC, OD, and OE meet are represented by $M_1$, $M_2$, $M_3$, $M_4$, and $M_5$, respectively. Therefore, in this embodiment, point C and point $M_3$ represent the same point.

Here, the length of the segmented image 201 observed at the viewpoint O, i.e., the apparent length is equal to the length of the line segment $M_1M_2$. Similarly, the apparent lengths of the segmented image 202, the segmented image 203, and the segmented image 204 are equal to the length of the line segment $M_2M_3$, the length of the line segment $M_3M_4$, and the length of the line segment $M_4M_5$, respectively.

When letting S represent the length of line-of-sight from the viewpoint to the focal point, S is equal to the length of the line segment OC, and therefore, can be obtained from the right triangle OCG as follows:

$$S = \frac{H}{\sin\theta_2} \quad (1)$$

Each of viewing angles $\theta_0$, $\theta_1$, $\theta_2$, $\theta_3$, and $\theta_4$ can be determined as follows:

$$\theta_0 = \tan^{-1}\left(\frac{H}{L}\right) \quad (2)$$

$$\theta_1 = \tan^{-1}\left(\frac{H}{a_1 + L}\right) \quad (3)$$

$$\theta_2 = \tan^{-1}\left(\frac{H}{a_1 + a_2 + L}\right) \quad (4)$$

$$\theta_3 = \tan^{-1}\left(\frac{H}{a_1 + a_2 + a_3 + L}\right) \quad (5)$$

$$\theta_4 = \tan^{-1}\left(\frac{H}{a_1 + a_2 + a_3 + a_4 + L}\right) \quad (6)$$

On the other hand, ∠AOB, ∠BOC, ∠COD, and ∠DOE correspond to $(\theta_0-\theta_1)$, $(\theta_1-\theta_2)$, $(\theta_2-\theta_3)$, and $(\theta_3-\theta_4)$, respectively.

When letting $h_1$, $h_2$, $h_3$, and $h_4$ represent the apparent lengths of the segmented images 201, 202, 203, and 204 (namely, the length of the line segment $M_1M_2$, the length of the line segment $M_2M_3$, the length of the line segment $M_3M_4$, and the length of the line segment $M_4M_5$), respectively, $h_1$, $h_2$, $h_3$, and $h_4$ can be determined as follows:

$$h_1 = S \times \tan\{(\theta_0 - \theta_1) + (\theta_1 - \theta_2)\} - S \times \tan(\theta_1 - \theta_2) \quad (7)$$
$$= S \times \{\tan(\theta_0 - \theta_2) - \tan(\theta_1 - \theta_2)\}$$

$$h_2 = S \times \tan(\theta_1 - \theta_2) \quad (8)$$
$$= S \times \{\tan(\theta_1 - \theta_2) - \tan(\theta_2 - \theta_2)\}$$

$$h_3 = S \times \tan(\theta_2 - \theta_3) \quad (9)$$
$$= -S \times \tan(\theta_3 - \theta_2)$$
$$= S \times \{\tan(\theta_2 - \theta_2) - \tan(\theta_3 - \theta_2)\}$$

$$h_4 = S \times \tan\{(\theta_2 - \theta_3) + (\theta_3 - \theta_4)\} - S \times \tan(\theta_2 - \theta_3) \quad (10)$$
$$= S \times \{\tan(\theta_3 - \theta_2) - \tan(\theta_4 - \theta_2)\}$$

In addition, when letting $y_1$, $y_2$, $y_3$, and $y_4$ represent conversion length to which each segmented image is to be converted, respectively, $y_1$, $y_2$, $y_3$, and $y_4$ can be determined as follows:

$$y_1 = \frac{h_4}{h_1 + h_2 + h_3 + h_4} \times T \quad (11)$$

$$y_2 = \frac{h_3}{h_1 + h_2 + h_3 + h_4} \times T \quad (12)$$

$$y_3 = \frac{h_2}{h_1 + h_2 + h_3 + h_4} \times T \quad (13)$$

$$y_4 = \frac{h_1}{h_1 + h_2 + h_3 + h_4} \times T \quad (14)$$

Here, T represents the entire vertical length of the subject image 200 (e.g., $T=a_1+a_2+a_3+a_4$ in this embodiment) that is to be applied to the ground surface 100 or created on the ground surface 100 through computer graphics work.

Although the embodiment of FIG. 4 describes the case of dividing the subject image 200 into four, the above equations can be applied to the case of dividing the subject image 200 into more than four as well.

When dividing the subject image 200 into n segmented images, the length of line-of-sight S from the viewpoint to the focal point, that is the apparent length $h_i$ of an $i^{th}$ segmented image (e.g., the first segmented image is the segmented image located closest to the viewpoint), and the viewing angle $\theta_i$ at an opposite end of an $i^{th}$ segmented image can be determined as follows:

$$\theta_i = \tan^{-1}\left\{\frac{H}{\sum_{j=1}^{i} a_j + L}\right\} \quad (15)$$

$$S = \frac{H}{\sin\theta_2} \quad (16)$$

$$h_i = S \times \{\tan(\theta_{i-1} - \theta_2) - \tan(\theta_i - \theta_2)\} \quad (17)$$

Therefore, when letting $y_1$, $y_2$, $y_3$, ..., and $y_n$ represent the conversion length of each segmented image, respectively, the conversion length of an $i^{th}$ segmented image can be determined as follows:

$$y_i = \frac{h_{n-i+1}}{\sum_{j=1}^{n} h_j} \times T \quad (18)$$

The table below shows the values of $\theta_i$, $h_i$, and $y_i$ for T=5m, L=15m, H=1.2m, n=10, and $a_1=a_2= \ldots =a_{10}=0.5$m.

TABLE 1

| i | $\theta_i$ (degree) | $h_i$ (meter) | $y_i$ (meter) |
|---|---|---|---|
| 1 | 4.426971647 | 0.044993202 | 0.385100236 |
| 2 | 4.289153329 | 0.042195515 | 0.405281269 |
| 3 | 4.159642294 | 0.039650901 | 0.427091356 |
| 4 | 4.037710621 | 0.03732973 | 0.45071068 |
| 5 | 3.922712891 | 0.035206586 | 0.476345042 |
| 6 | 3.814074834 | 0.033259565 | 0.504230364 |
| 7 | 3.711283808 | 0.031469712 | 0.534638136 |
| 8 | 3.613880752 | 0.029820553 | 0.567882051 |
| 9 | 3.521453377 | 0.02829772 | 0.60432613 |
| 10 | 3.433630362 | 0.026888632 | 0.644394734 |

As can be seen from the above table, the conversion length $y_{10}$ of the tenth segmented image is approximately 1.7 times the conversion length $y_1$ of the first segmented image.

FIGS. 9 and 10 are diagrams showing converted images obtained by applying the value $y_i$ obtained in above Table 1 to subject images, respectively.

In FIG. 9a, the left side shows the subject image, "어린이 보호구역 (children protection zone)," and the right side shows the converted image modified by using the value $y_i$ obtained in Table 1. In the subject image, the vertical lengths of "어린이 (children)" and "보호구역 (protection zone)" are the same, but in the converted image, the vertical length of "어린이 (children)" is longer than that of "보호구역 (protection zone)." Also, it can be seen that there are changes in horizontal strokes. For example, in the converted image, the bottom horizontal strokes of "보호구역 (protection zone)" became thinner while the top horizontal strokes of "어린이 (children)" became thicker.

FIG. 9b shows the subject image and the converted image viewed from a distance, respectively. Both images have the total vertical length T of 5m, respectively, and have been viewed from the viewpoint at the viewpoint distance L=15m and the viewpoint height H=1.2m. The left side is the subject image, and the right side is the converted image. When viewing from a distance, in the subject image, "어린이 (children)" appears to be smaller than "보호구역 (protection zone)," but in the converted image, "어린이 (children)" and "보호구역 (protection zone)" appear almost the same size. Also, in the subject image, the farther away a horizontal stroke is from the viewpoint, the thinner the stroke appears to be, but in the converted image, the thickness of the horizontal stroke appears to be substantially the same overall.

Figure 10A:
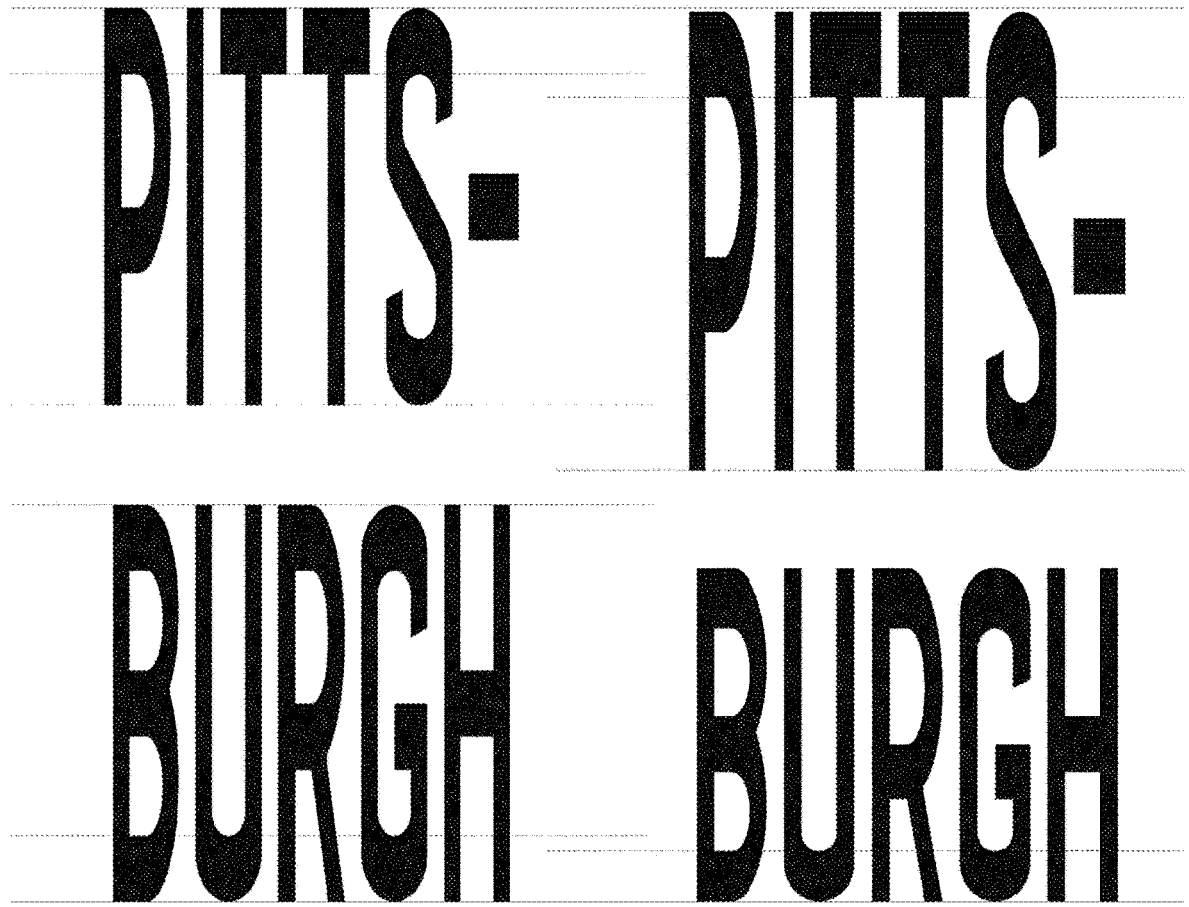
FIG. 10a shows a subject image and an image converted by the present invention.
Figure 10B:
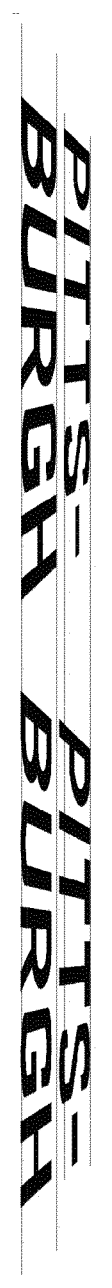

FIGS. 10a and 10b show the subject image "PITTSBURGH" and its converted image, respectively. Descriptions of each are the same as those for FIGS. 9a and 9b, and thus repeated descriptions thereof is omitted.

Figure 11:
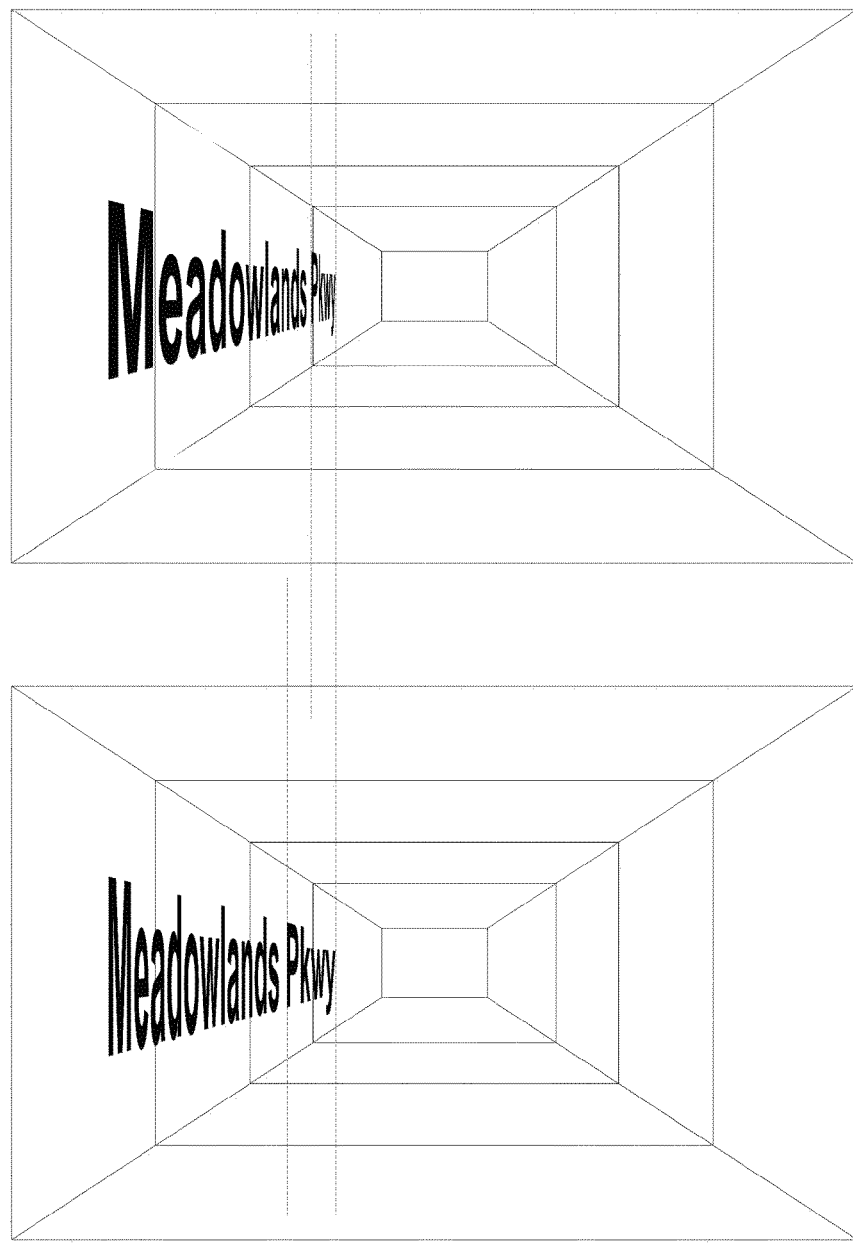
FIG. 11 shows a subject image and a converted image seen from a particular viewpoint, both of which are created on a left side surface of a space.

FIG. 11 shows a subject image and its converted image created on the left side in space, rather than the images applied on the bottom surface as in FIGS. 9 and 10. Such an arrangement of an image may occur mainly in an AR or VR environment but is not limited to it. For example, it may be applied to a signboard or a road sign standing on the side of the road.

The upper view of FIG. 11 shows the subject image with perspective, and the lower one shows the converted image with perspective. As can be seen from the figure, in the subject image, the farther away from the viewpoint, the text becomes less visible, but in the converted image, it is apparent regardless of the position. In particular, it can be seen that the latter part "Pkwy" looks roughly doubled in the converted image.

Figure 12:
FIG. 12 shows a screenshot of the Street View of FIG. 3 (above) and an image converted by the present invention (below).
Figure 12:

FIG. 12 shows both the screenshot of Street View of FIG. 3 (the upper view) and the screenshot in which the road marking is converted according to the present invention (lower view). As can be seen from the figure, the reduced legibility of "Pkwy" has significantly been improved after the conversion.

Meanwhile, in FIG. 4, the focal point is located at the center of the subject image, but the present invention may be applied even when the focal point is located at a different position.

FIG. 5 shows an embodiment in this regard.

Figures 5A, 5B:
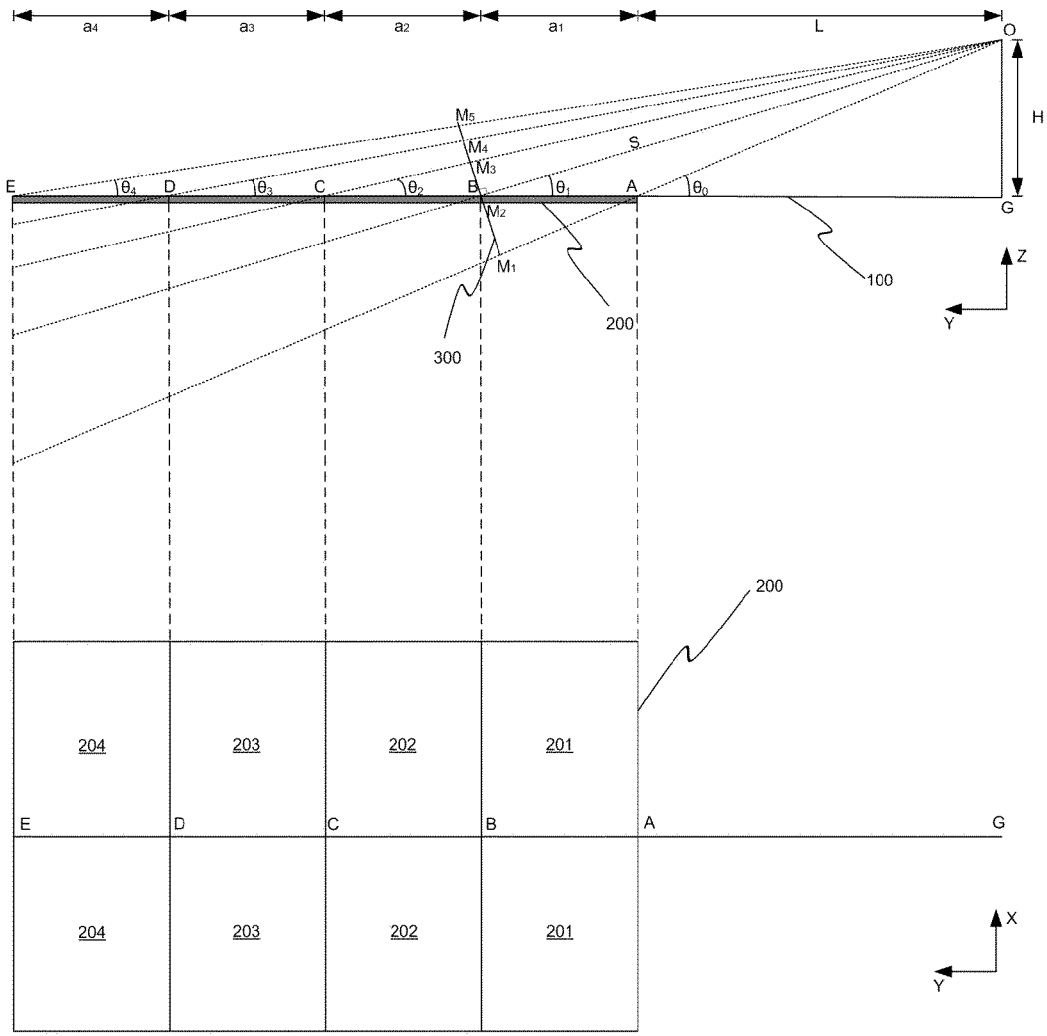
FIG. 5 schematically illustrates a modified embodiment of the embodiment of FIG. 4.

As in FIG. 4, FIG. 5(b) is a plan view of a position where the subject image 200 is to be arranged, and FIG. 5(a) schematically shows a cross-section taken along the line GE of FIG. 5(b).

In FIG. 5, the focal point is located between the first segmented image and the second segmented image. Thus, the focal-plane 300 is orthogonal to the line-of-sight OB at point B.

The length of the line-of-sight S from the viewpoint to the focal point is equal to the length of the line segment OB, so from the right triangle OBG, we can obtain the following equation:

$$S = \frac{H}{\sin\theta_1} \tag{19}$$

When letting $h_1$, $h_2$, $h_3$, and $h_4$ represent the apparent lengths of the segmented images 201, 202, 203, and 204, respectively, $h_1$, $h_2$, $h_3$, and $h_4$ can be determined as follows:

$$\begin{aligned} h_1 &= S \times \tan(\theta_0 - \theta_1) \\ &= S \times \{\tan(\theta_0 - \theta_1) - \tan(\theta_1 - \theta_1)\} \end{aligned} \tag{20}$$

$$\begin{aligned} h_2 &= S \times \tan(\theta_1 - \theta_2) \\ &= S \times \{\tan(\theta_1 - \theta_1) - \tan(\theta_2 - \theta_1)\} \end{aligned} \tag{21}$$

$$\begin{aligned} h_3 &= S \times \tan\{(\theta_1 - \theta_2) + (\theta_2 - \theta_3)\} - S \times \tan(\theta_1 - \theta_2) \\ &= S \times \{\tan(\theta_2 - \theta_1) - \tan(\theta_3 - \theta_1)\} \end{aligned} \tag{22}$$

$$\begin{aligned} h_4 &= S \times \tan\{(\theta_1 - \theta_2) + (\theta_2 - \theta_3) + (\theta_3 - \theta_4)\} - \\ &\quad S \times \tan\{(\theta_1 - \theta_2) + (\theta_2 - \theta_3)\} \\ &= S \times \{\tan(\theta_3 - \theta_1) - \tan(\theta_4 - \theta_1)\} \end{aligned} \tag{23}$$

The lengths $y_1, y_2, y_3, y_4$ to which each segmented images are to be converted can be determined according to Equations (11) to (14) above.

Likewise, if the subject image is divided into n segmented images, the above equations (15) to (18) can be similarly applied as follows:

$$\theta_i = \tan^{-1}\left(\frac{H}{\sum_{j=1}^{i} a_j + L}\right) \tag{15}$$

$$S = \frac{H}{\sin\theta_1} \tag{16'}$$

$$h_i = S \times \{\tan(\theta_{i-1} - \theta_1) - \tan(\theta_i - \theta_1)\} \tag{17'}$$

-continued $$y_i = \frac{h_{n-i+1}}{\sum_{j=1}^{n} h_j} \times T \quad (18)$$

In the embodiments of FIGS. 4 and 5, when letting $\theta_f$ represent the viewing angle formed by the focal point and the viewpoint, equations (16), (16'), (17), and (17') can be generalized as follows:

$$S = \frac{H}{\sin \theta_f} \quad (24)$$

$$h_i = S \times \{\tan(\theta_{i-1} - \theta_f) - \tan(\theta_i - \theta_f)\} \quad (25)$$

(Where f is an integer of 0 or more and n or less)

As a result, it can be seen that irrespective of which segmented image the focal point is located on, the same conversion lengths are obtained if the viewpoint conditions (e.g., $\theta_0$, H, L, and the like) are the same.

FIG. 6 shows another alternative embodiment of the present invention.

In the present embodiment, instead of finding apparent lengths in a focal-plane, an approach of obtaining the apparent lengths of each segmented image at points located at the same distance from the viewpoint O is used.

Figures 6A, 6B:
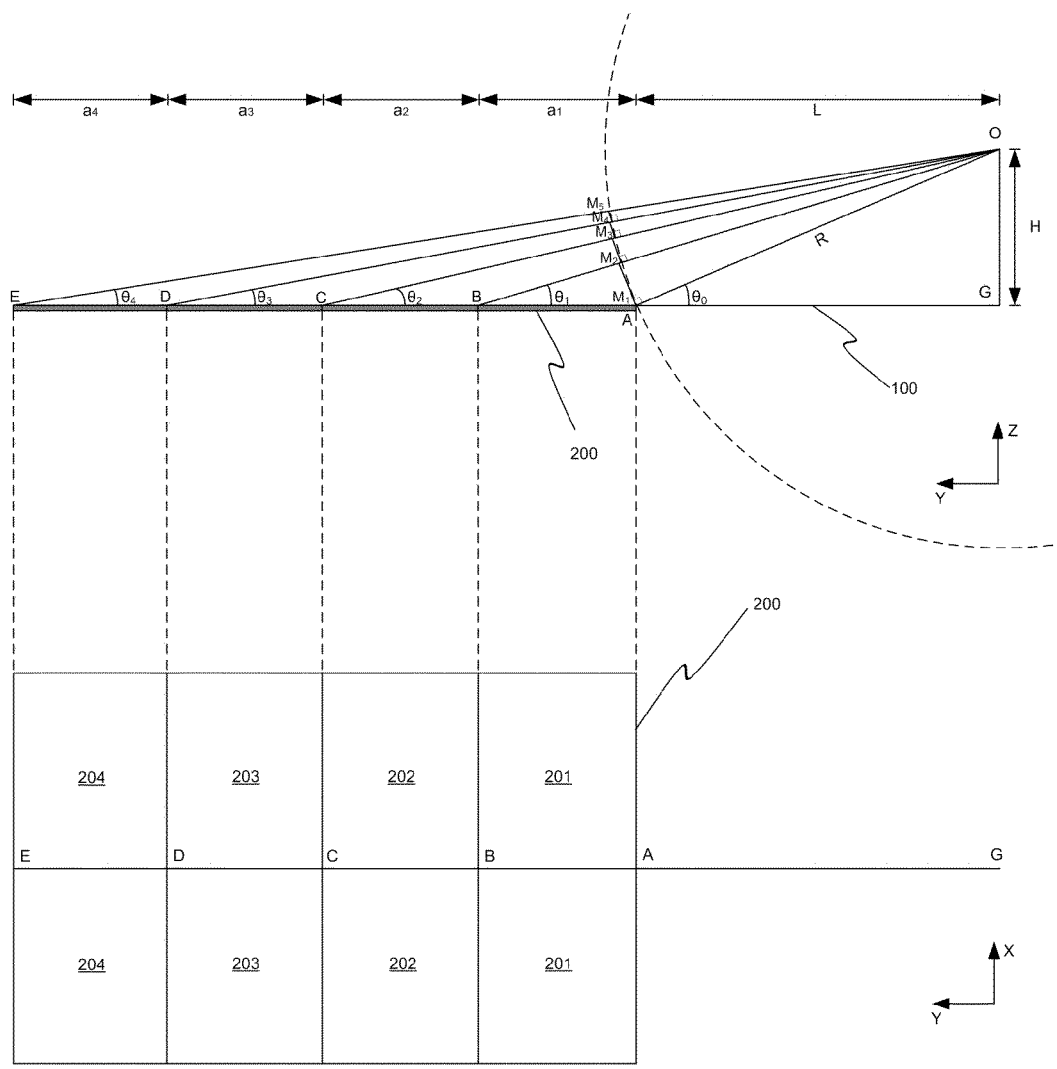
FIG. 6 schematically illustrates an image correction method according to another embodiment of the present invention.

As before, FIG. 6(b) is a plan view of a position where the subject image 200 is to be arranged, and FIG. 6(a) schematically shows a cross-section taken along the line GE of FIG. 6(b).

In FIG. 6, the subject image is divided into four segments, AB, BC, CD, and DE, similar to the above embodiments. Here, $M_1$ represents a point where the line-of-sight OA meets a circle (hereinafter referred to as 'circle O') centering on the viewpoint O and having a radius of R. Radius R is the length of line-of-sight from the viewpoint to the viewpoint-facing end of the subject image. $M_2$ represents the point where the tangent drawn at point $M_1$ meets the line-of-sight OB. $M_3$ represents the point where the line-of-sight OC meets the tangent line drawn at the location where the circle O meets the line-of-sight OB. $M_4$ represents the point where the line-of-sight OD meets the tangent line drawn at the location where the circle O meets the line-of-sight OC. $M_5$ represents the point where the line-of-sight OE meets the tangent line drawn at the location where the circle O meets the line-of-sight OD.

The apparent length of the first segmented image 201 viewed from the viewpoint O can correspond to the length of the line segment $M_1M_2$.

If measuring the apparent length of the second segmented image 202 viewed from the viewpoint O at the same distance as the distance at which the apparent length of the first segmented image 201 is measured, it corresponds to the length of the line segment $M_2M_3$.

Similarly, the apparent length of the third segmented image 203 viewed from the viewpoint O and the apparent length of the fourth segmented image 204 viewed from the viewpoint O correspond to the length of the line segment $M_3M_4$ and the length of the line segment $M_4M_5$, respectively.

The radius R can be determined from the right triangle OAG as follows:

$$R = \frac{H}{\sin \theta_1} \quad (26)$$

The viewing angles $\theta_0$, $\theta_1$, $\theta_2$, $\theta_3$, and $\theta_4$ can be obtained according to Equations (2) to (6). Similarly, $\angle AOB$, $\angle BOC$, $\angle COD$, and $\angle DOE$ correspond ($\theta_0$-$\theta_1$), ($\theta_1$-$\theta_2$), ($\theta_2$-$\theta_3$), and ($\theta_3$-$\theta_4$), respectively.

Therefore, when letting $h_1$, $h_2$, $h_3$, and $h_4$ represent the apparent lengths of the segmented images 201, 202, 203, and 204 (namely, the length of the line segment $M_1M_2$, the length of the line segment $M_2M_3$, the length of the line segment $M_3M_4$, and the length of the line segment $M_4M_5$), respectively, $h_1$, $h_2$, $h_3$, and $h_4$ can be determined as follows:

$$h_1 = R \times \tan(\theta_0 - \theta_1) \quad (27)$$

$$h_2 = R \times \tan(\theta_1 - \theta_2) \quad (28)$$

$$h_3 = R \times \tan(\theta_2 - \theta_3) \quad (29)$$

$$h_4 = R \times \tan(\theta_3 - \theta_4) \quad (30)$$

The conversion lengths $y_1$, $y_2$, $y_3$, $y_4$ to which each segmented image is to be converted can be obtained according to the above equations (11) to (14), respectively.

Although the embodiment of FIG. 6 describes the case of dividing the subject image 200 into four, the above equations can be applied to the case of dividing the subject image 200 into more than four as well.

When dividing the subject image 200 into n segmented images, the viewing angle $\theta_i$ at an opposite end of an $i^{th}$ segmented image (e.g., the first segmented image is the segmented image located closest to the viewpoint) can be determined using the above equation (15), and the apparent length $h_i$ of the $i^{th}$ segmented image can be obtained as follows:

$$h_i = R \times \tan(\theta_{i-1} - \theta_i) \quad (31)$$

As before, when letting $y_1$, $y_2$, $y_3$, . . . , and $y_n$ represent the conversion length of each segmented image, respectively, the conversion length of an $i^{th}$ segmented image can be determined using the above equation (18).

The table below shows the values of $\theta_i$, $h_i$, and $y_i$, for T=5m, L=15m, H=1.2m, n=10, and $a_1 = a_2 = \ldots = a_{10} = 0.5m$.

TABLE 2

| i | $\theta_i$ (degree) | $h_i$ (meter) | $y_i$ (meter) |
|---|---|---|---|
| 1 | 4.426971647 | 0.038594315 | 0.385090146 |
| 2 | 4.289153329 | 0.036196096 | 0.40527958 |
| 3 | 4.159642294 | 0.034014294 | 0.427097203 |
| 4 | 4.037710621 | 0.032023672 | 0.450722661 |
| 5 | 3.922712891 | 0.030202563 | 0.476361038 |
| 6 | 3.814074834 | 0.028532278 | 0.504247297 |
| 7 | 3.711283808 | 0.026996633 | 0.534651652 |
| 8 | 3.613880752 | 0.025581555 | 0.567886102 |
| 9 | 3.521453377 | 0.02427476 | 0.604312407 |
| 10 | 3.433630362 | 0.023065487 | 0.644351914 |

In this embodiment, it can be seen that the conversion length values that are similar to those in Table 1 above.

FIG. 7 shows a modified embodiment of the embodiment of FIG. 6.

Figures 7A, 7B:
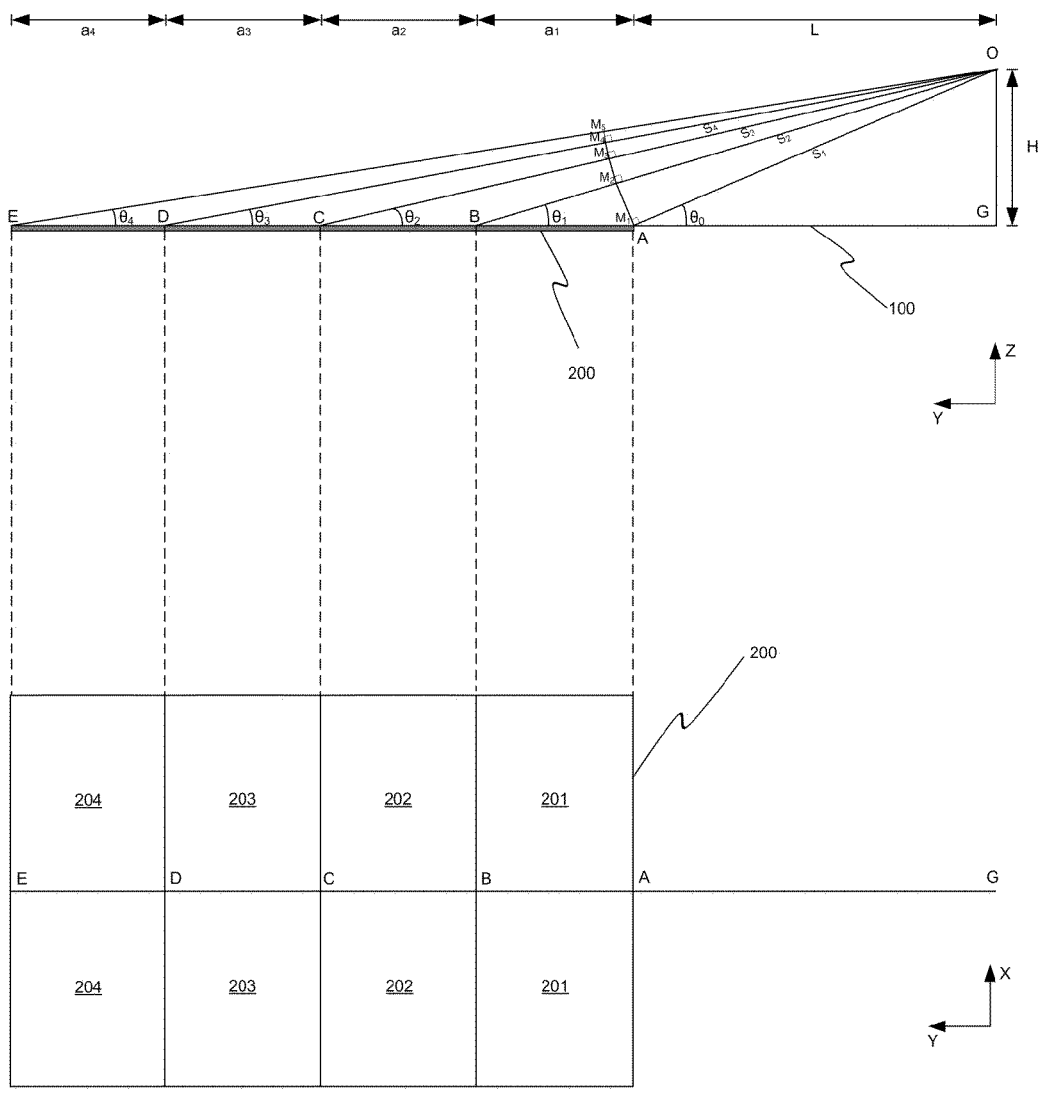
FIG. 7 schematically illustrates a modified embodiment of the embodiment of FIG. 6.

As before, FIG. 7(b) is a plan view of a position where the subject image 200 is to be arranged, and FIG. 7(a) schematically shows a cross-section taken along the line GE of FIG. 7(b).

In FIG. 7, the subject image is divided into four segments, AB, BC, CD, and DE, similar to the above embodiments. $M_1$ represents the point where a line extending perpendicular to the line-of-sight OA at point A meets the line-of-sight OA, thus point A and point $M_1$ represent the same point. $M_2$ represents the point where a line extending perpendicular to the line-of-sight OA at point $M_1$ meets the line-of-sight OB. $M_3$ represents the point where a line extending perpendicular to the line-of-sight OB at point $M_2$ meets the line-of-sight OC. $M_4$ represents the point where a line extending perpendicular to the line-of-sight OC at point $M_3$ meets the line-of-sight OD. $M_5$ represents the point where a line extending perpendicular to the line-of-sight OD at point $M_4$ meets the line-of-sight OE.

The apparent length of the first segmented image 201 viewed from the viewpoint O can correspond to the length of the line segment $M_1M_2$.

The distance from the viewpoint O to point $M_2$ is greater than the distance from the viewpoint O to point $M_1$, but the difference is negligible. Thus, the length of line segment $M_2M_3$ can be considered as the apparent length of the second segmented image 202 viewed at the viewpoint O.

Similarly, the length of the line segment $M_3M_4$ and the length of the line segment $M_4M_5$ can be considered as the apparent length of the second segmented image 203 viewed at viewpoint O and the apparent length of the second segmented image 204 viewed at viewpoint O, respectively.

In addition, ∠AOB, ∠BOC, ∠COD, and ∠DOE correspond $(\theta_0-\theta_1)$, $(\theta_1-\theta_2)$, $(\theta_2-\theta_3)$, and $(\theta_3-\theta_4)$, respectively.

Here, when letting $S_1$, $S_2$, $S_3$, and $S_4$ represent the lengths of the line segments $OM_1$, $OM_2$, $OM_3$, and $OM_4$, respectively, the lengths of $S_1$, $S_2$, $S_3$, and $S_4$ can be determined as follows:

$$S_1 = \frac{H}{\cos(90-\theta_1)} \quad (32)$$

$$S_2 = \frac{S_1}{\cos(\theta_0-\theta_1)} \quad (33)$$

$$S_3 = \frac{S_2}{\cos(\theta_1-\theta_2)} \quad (34)$$

$$S_4 = \frac{S_3}{\cos(\theta_2-\theta_3)} \quad (35)$$

The viewing angles $\theta_0$, $\theta_1$, $\theta_2$, $\theta_3$, and $\theta_4$ can be obtained according to Equations (2) to (6).

Therefore, when letting $h_1$, $h_2$, $h_3$, and $h_4$ represent the apparent lengths of the segmented images 201, 202, 203, and 204 (namely, the length of the line segment $M_1M_2$, the length of the line segment $M_2M_3$, the length of the line segment $M_3M_4$, and the length of the line segment $M_4M_5$), respectively, $h_1$, $h_2$, $h_3$, and $h_4$ can be determined as follows:

$$h_1 = S_1 \times \tan(\theta_0-\theta_1) \quad (36)$$

$$h_2 = S_2 \times \tan(\theta_1-\theta_2) \quad (37)$$

$$h_3 = S_3 \times \tan(\theta_2-\theta_3) \quad (38)$$

$$h_4 = S_4 \times \tan(\theta_3-\theta_4) \quad (39)$$

The conversion lengths $y_1$, $y_2$, $y_3$, $y_4$ to which each segmented image is to be converted can be obtained according to the above equations (11) to (14), respectively.

Although the embodiment of FIG. 7 describes the case of dividing the subject image into four, the above equations can be applied to the case of dividing the subject image into more than four as well.

When dividing the subject image 200 into n segmented images, the viewing angle $\theta_i$ at an opposite end of an $i^{th}$ segmented image (e.g., the first segmented image is the segmented image located closest to the viewpoint) can be determined using the above equation (15), and the apparent length $h_i$ of the $i^{th}$ segmented image can be obtained as follows:

$$h_i = S_i \times \tan(\theta_{i-1}-\theta_i) \quad (40)$$

Here, $S_i$ is as follows:

$$S_i = \frac{S_{i-1}}{\cos(\theta_{i-2}-\theta_{i-1})} \quad (41)$$

$$\left(\text{where, } S_1 = \frac{H}{\cos(90-\theta_1)}\right)$$

As before, when letting $y_1$, $y_2$, $y_3$, ..., and $y_n$ represent the conversion length of each segmented image, respectively, the conversion length of an $i^{th}$ segmented image can be determined using the above equation (18).

The table below shows the values of $\theta_i$, $h_i$, and $y_i$, for T=5m, L=15m, H=1.2m, n=10, and $a_1=a_2=...=a_{10}=0.5$m.

TABLE 3

| i | $\theta_i$ (degree) | $h_i$ (meter) | $y_i$ (meter) |
|---|---|---|---|
| 1 | 4.426971647 | 0.038594315 | 0.385093659 |
| 2 | 4.289153329 | 0.036196215 | 0.405282749 |
| 3 | 4.159642294 | 0.034014504 | 0.427099926 |
| 4 | 4.037710621 | 0.032023952 | 0.45072481 |
| 5 | 3.922712891 | 0.030202895 | 0.476362452 |
| 6 | 3.814074834 | 0.028532649 | 0.504247778 |
| 7 | 3.711283808 | 0.026997033 | 0.534650952 |
| 8 | 3.613880752 | 0.025581975 | 0.567883907 |
| 9 | 3.521453377 | 0.024275193 | 0.604308324 |
| 10 | 3.433630362 | 0.023065929 | 0.644345441 |

In this embodiment, it can be seen that the conversion length values that are similar to those in Tables 1 and 2 above.

FIG. 8 shows yet another alternative embodiment of the present invention.

Figures 8A, 8B:
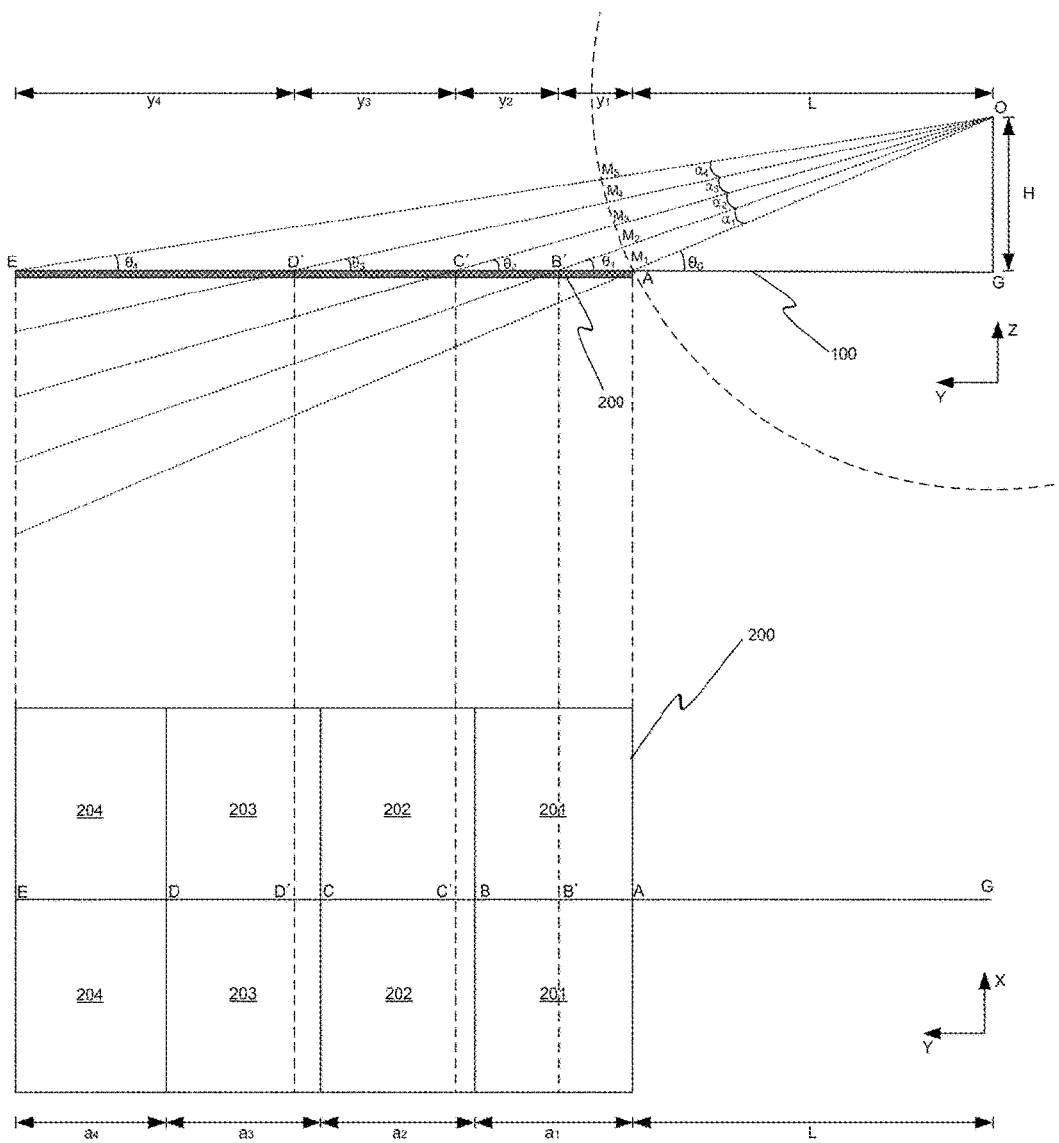
FIG. 8 schematically illustrates an image correction method according to yet another embodiment of the present invention.

As before, FIG. 8(b) is a plan view of a position where the subject image 200 is to be arranged, and FIG. 8(a) schematically shows a cross-section taken along the line GE of FIG. 8(b).

The embodiment of FIG. 8 uses an approach of dividing the viewpoint angle ∠AOE at the viewpoint O for the entire subject image 200 into the desired numbers and calculating conversion lengths using thus split angles.

In FIG. 8, the subject image is divided into four segments, AB, BC, CD, and DE, similar to the above embodiments. The vertical lengths of the corresponding segmented images 201, 202, 203, and 204 are represented by $a_1$, $a_2$, $a_3$, and $a_4$, respectively (see FIG. 8(b)). Points A, B, C, D, and E represent positions where the horizontal lines of thus divided segmented images 201, 202, 203, and 204 meet the line which passes through point G and is parallel to the Y-axis, respectively.

Following the number of segmented images, the angle ∠AOE looking at the entire subject image 200 from the viewpoint O is also divided into four angles α1, α2, α3, and α4. Each angle is then divided into sizes that satisfy the following equation:

$$\alpha_1:\alpha_2:\alpha_3:\alpha_4 = a_1:a_1:a_3:a_4 \quad (42)$$

Points A, B', C', D', and E represent positions where the angle dividing lines meet the subject image 200, respectively.

In this way, the subject image is divided into new four sections, section AB', section B'C', section C'D', and section D'E.

Assuming circle O centered on point O and having a radius of segment OA, lengths of arc $M_1M_2$, arc $M_2M_3$, arc $M_3M_4$, and arc $M_4M_5$ may be substantially equal to the lengths of section AB', section B'C', section C'D', and section D'E observed at the viewpoint O, respectively (if the radius is large enough). Therefore, the length of the line segment AB', the length of the line segment B'C', the length of the line segment C'D', and the length of the line segment D'E can be obtained as the conversion lengths $y_1$, $y_2$, $y_3$, and $y_4$, respectively, of the segmented images.

When letting T represent the entire vertical length of the subject image 200 ($T = a_1 + a_2 + a_3 + a_4$ in this embodiment), viewing angles $\theta_0$ and $\theta_4$ are as follows:

$$\theta_0 = \tan^{-1}\left(\frac{H}{L}\right) \quad (43)$$

$$\theta_4 = \tan^{-1}\left(\frac{H}{L+T}\right) \quad (44)$$

Meanwhile, the ratio of the vertical length of the first segmented image 201 to the entire vertical length of the subject image 200 is $a_1/T$. Therefore, the viewpoint angle $\alpha_1$ for the segmented image 201 can be obtained as follows by using the above Equation (42):

$$\alpha_1 = (\theta_0 - \theta_4) \times \left(\frac{a_1}{T}\right) \quad (45)$$

Similarly, the viewing angles $\alpha_2$, $\alpha_3$, and $\alpha_4$ for the second to fourth segmented images 202 to 204 can be obtained as follows:

$$\alpha_2 = (\theta_0 - \theta_4) \times \left(\frac{a_2}{T}\right) \quad (46)$$

$$\alpha_3 = (\theta_0 - \theta_4) \times \left(\frac{a_3}{T}\right) \quad (47)$$

$$\alpha_4 = (\theta_0 - \theta_4) \times \left(\frac{a_4}{T}\right) \quad (48)$$

Then, conversion lengths $y_1$, $y_2$, $y_3$, $y_4$ for the segmented images can be determined as follows:

$$y_1 = \frac{H}{\tan\theta_1} - L \quad (49)$$
$$= \frac{H}{\tan(\theta_0 - \alpha_1)} - L$$

$$y_2 = \frac{H}{\tan\theta_2} - L - y_1 \quad (50)$$
$$= \frac{H}{\tan\{\theta_0 - (\alpha_1 + \alpha_2)\}} - (L + y_1)$$

$$y_3 = \frac{H}{\tan\theta_3} - L - (y_1 + y_2) \quad (51)$$
$$= \frac{H}{\tan\{\theta_0 - (\alpha_1 + \alpha_2 + \alpha_3)\}} - (L + y_1 + y_2)$$

$$y_4 = \frac{H}{\tan\theta_4} - L - (y_1 + y_2 + y_3) \quad (52)$$
$$= \frac{H}{\tan\{\theta_0 - (\alpha_1 + \alpha_2 + \alpha_3 + \alpha_4)\}} - (L + y_1 + y_2 + y_3)$$

Although the embodiment of FIG. 8 describes the case of dividing the subject image 200 into four, the above equations can be applied to the case of dividing the subject image 200 into more than four as well.

When dividing the subject image 200 into n segmented images, the conversion length $y_i$ and the viewpoint angle $\alpha_i$ of an $i^{th}$ segmented image (e.g., the first segmented image is the segmented image located closest to the viewpoint) can be determined as follows:

$$\alpha_i = (\theta_0 - \theta_n) \times \left(\frac{a_i}{T}\right) \quad (53)$$

$$y_i = \frac{H}{\tan\left(\theta_0 - \sum_{j=1}^{i}\alpha_j\right)} - \left(L + \sum_{j=1}^{i-1}y_j\right) \quad (54)$$

Here, $\theta_0$ and $\theta_n$ can be obtained through the above Equations (2) and (15), respectively.

The table below shows the values of $\theta_i$ and $y_i$, for T=5m, L=15m, H=1.2m, n=10, and $a_1 = a_2 = \ldots = a_{10} = 0.5$m.

TABLE 4

| i | $\theta_i$ (degree) | $y_i$ (meter) |
|---|---|---|
| 1 | 4.45989217 | 0.385129017 |
| 2 | 4.34586308 | 0.405297584 |
| 3 | 4.231833991 | 0.427096516 |
| 4 | 4.117804901 | 0.450706402 |
| 5 | 4.003775811 | 0.47633355 |
| 6 | 3.889746721 | 0.504214506 |
| 7 | 3.775717632 | 0.534621535 |
| 8 | 3.661688542 | 0.567869297 |
| 9 | 3.547659452 | 0.604323018 |
| 10 | 3.433630362 | 0.644408573 |

Again, in this embodiment, it can be seen that the conversion length values that are similar to those in Tables 1 to 3 above.

As an additional embodiment of the present invention, a correction factor $f_i$ can be used to modify each of Equations (18) and (54) as follows:

$$y_i = f_i \times \frac{h_{n-i+1}}{\sum_{j=1}^{n}h_j} \times T \quad (55)$$

$$y_i = f_i \times \left\{\frac{H}{\tan\left(\theta_0 - \sum_{j=1}^{i}\alpha_j\right)} - \left(L + \sum_{j=1}^{i-1}y_j\right)\right\} \quad (56)$$

The correction factor $f_i$ may be appropriately selected depending on the situations or conditions under which an image is applied to or created. For example, when using the correction factor $$f_i = 0.9 + \frac{0.2}{n} \times i,$$

the closer a segmented image locates to the viewpoint, the smaller the conversion length is, and the farther a segmented image locates from the viewpoint, the bigger the conversion length is. The value of $f_i$ is not limited to it, and a person having ordinary skill in the art will appreciate that other appropriate values may be selected according to the user's needs or conditions such as ground surface conditions.

An embodiment of the present invention provides an image correction apparatus that can implement the image correction methods as described above.

Figure 13:
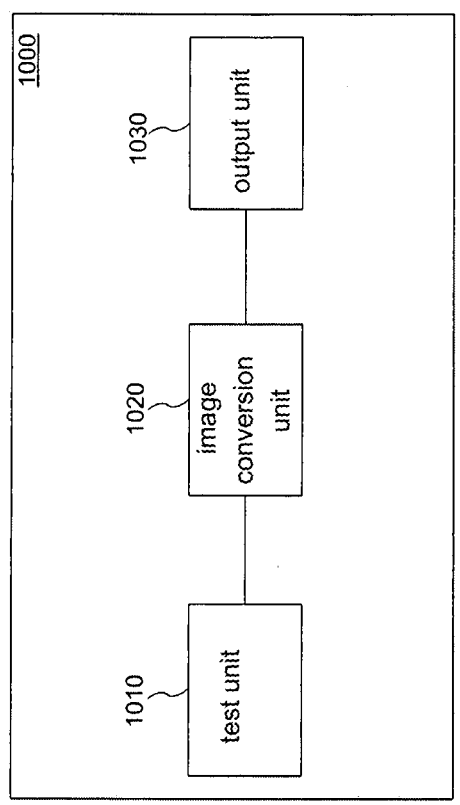
FIG. 13 schematically shows the configuration of an image correction apparatus according to an embodiment of the present invention.

FIG. 13 is a block diagram illustrating one embodiment of such an image correction apparatus. Now referring to FIG. 13, the image correction apparatus 1000 according to an exemplary embodiment of the present invention includes an input unit 1010, an image conversion unit 1020, and an output unit 1030.

Users may input information about subject images 200 to be converted through the input unit 1010. Information about subject images may include image files of the subject images and widths and lengths (length T in the above embodiments) of locations to which the subject image is to be applied.

Also, users may input the number into which the subject image 200 is to be divided and vertical lengths $a_1$, $a_2$, $a_3$, and so on of segmented images. Preferably each segmented image can be divided into equal lengths (i.e., $a_1=a_2=a_3= \ldots =a_n$).

In addition, users may input viewpoint information through the input unit 1010. The viewpoint information refers to information sufficient to enable the position of a viewpoint to be specified with respect to a subject image. For example, the viewpoint information may include a distance at which a viewpoint is spaced from the subject image, a viewpoint angle, and the like.

More specifically, the viewpoint information may include, for example, a viewpoint height H from a plane where the subject image locates to the viewpoint; a viewpoint distance L from a point at which the viewpoint projects on a ground surface 100 where the subject image locates to a viewpoint-facing end of the subject image; a viewing angle at the viewpoint-facing end of the subject image; a viewing angle at an opposite end of the subject image; a length of line-of-sight from the viewpoint to the viewpoint-facing end of the subject image; a length of line-of-sight from the viewpoint to the opposite end of the subject image; and a viewpoint angle for the subject image. Since the viewpoint information only needs to specify the position of the viewpoint with respect to the subject image 200, not all of them are necessary. In other words, for example, in the embodiment of FIG. 6, a person having ordinary skill in the art will understand that if the viewpoint distance L and the viewpoint height H are known, the viewing angle $\theta_0$, the length R, and the like can be obtained using them.

The subject image input through the input unit 1010 may be converted by the image conversion unit 1020 through the processes described above. For example, the image conversion unit obtains $y_i$ for an $i^{th}$ segmented image by using Equation (18) or (54) above and then converts the subject image 200 by increasing or decreasing the vertical length of a corresponding segmented image according to the obtained $y_i$. As an example, in the embodiment of FIG. 4, if the vertical length of the segmented image 201 is 1 m, and the calculated $y_1$ is 0.7 m, the image conversion unit reduces the vertical length to 0.7 m while maintaining the horizontal length of the segmented image 201.

The output unit 1030 may output the image converted by the image conversion unit 1020 in the desired format. For example, the output unit 1030 may output the converted image in a file format such as jpg, TIFF, XML, or the like, but this is only an example, and the output unit may output in any known form or format as necessary. In particular, when the image correction apparatus according to the present invention is used for the implementation of AR, VR, or the like, the converted image can be provided according to the format required by the AR or VR device.

Embodiments of the present invention may also be implemented in the form of recording media, that is, computer-readable media containing instructions executable by a computer, such as a program module executed by the computer. Such computer-readable media may record a program for executing the above-described method for converting an image.

The computer-readable media can be any available media that can be accessed by a computer and includes both volatile and nonvolatile media, removable and non-removable media. In addition, computer-readable media may include both computer storage media and communication media.

Computer storage media includes both volatile and non-volatile, removable and non-removable media implemented in any method or technology for storage of information such as computer-readable instructions, data structures, program modules, or other data. Examples of computer-readable media include magnetic media such as hard disks, floppy disks, and magnetic tape; optical recording media such as CDs and DVDs; magneto-optical media such as floptical disks; and hardware devices that are specially configured to store and perform program instructions, such as read-only memory (ROM), random access memory (RAM), flash memory, and the like.

Communication media typically includes computer-readable instructions, data structures, program modules, or other data in a modulated data signal such as a carrier wave, or other transmission mechanisms, and includes any information delivery media.

Examples of computer-readable instructions include not only machine code such as produced by a compiler, but also high-level language code that can be executed by a computer using an interpreter or the like.

The above description is merely illustrative of the technical idea of the present invention, and a person having ordinary skill in the art to which the present invention pertains may make various modifications and changes without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

DESCRIPTION OF THE SIGN

10: rectangle
100: ground surface

200: subject image
201, 202, 203, 204: segmented image
300, 400: focal-plane
1000: image correction apparatus
1010: input unit
1020: image conversion unit
1030: output unit

The invention claimed is:

1. An image correction method, comprising:
    providing a first image;
    providing viewpoint information about a viewpoint which observes the first image;
    dividing the first image into two or more segmented images along a horizontal direction of the first image; and
    providing a second image converted from the first image by converting each of the two or more segmented images based on the viewpoint information and vertical lengths of each of the segmented images
    wherein providing the second image converted from the first image comprises:
        obtaining an apparent length of each segmented image based on the viewpoint information and the vertical lengths of each of the segmented images; and
        obtaining a conversion length for each segmented image from the apparent lengths.

2. The image correction method of claim 1, wherein obtaining the conversion length for each segmented image from the apparent lengths comprises:
    obtaining the conversion length for each segmented image such that a ratio of a conversion length for an $i^{th}$ segmented image to an entire conversion length for the first image equals a ratio of an apparent length of an $(n-i+1)^{th}$ segmented image to an entire apparent length of the first image,
    wherein n is the total number of the segmented images.

3. The image correction method of claim 1, wherein obtaining the conversion length for each segmented image from the apparent lengths comprises:
    obtaining a conversion length $y_i$ of an $i^{th}$ segmented image using a conversion equation below;

$$y_i = \frac{h_{n-i+1}}{\sum_{j=1}^{n} h_j} \times T,$$

wherein $h_i$ is an apparent length of the $i^{th}$ segmented image, n is the total number of the segmented images, and T is an entire length of the first image.

4. The image correction method of claim 1, wherein obtaining the apparent length of each segmented image comprises:
    obtaining the apparent length through an equation for calculating the apparent length,
    wherein the equation for calculating an apparent length $h_i$ for an $i^{th}$ segmented image is $$h_i = S \times \{\tan(\theta_{i-1} - \theta_f) - \tan(\theta_i - \theta_f)\}, \text{ and}$$

wherein S is a length of line-of-sight from the viewpoint to a focal point, $\theta_i$ is a viewing angle at an opposite end of the $i^{th}$ segmented image, $\theta_0$ is a viewing angle at a viewpoint-facing end of a first segmented image, and $\theta_f$ is a viewing angle at the focal point.

5. The image correction method of claim 1, wherein obtaining the apparent length of each segmented image comprises:
    obtaining the apparent length through an equation for calculating the apparent length,
    wherein the equation for calculating an apparent length $h_i$ for an $i^{th}$ segmented image is $$h_i = R \times \tan(\theta_{i-1} - \theta_i), \text{ and}$$

wherein R is a length of line-of-sight from the viewpoint to a viewpoint-facing end of the first image, $\theta_i$ is a viewing angle at an opposite end of the $i^{th}$ segmented image, $\theta_0$ is a viewing angle at a viewpoint-facing end of a first segmented image.

6. The image correction method of claim 1, wherein the viewpoint information comprises information that can specify a position of the viewpoint with respect to the first image.

7. The image correction method of claim 6, wherein the viewpoint information comprises at least two of:
    a viewpoint height (H) from a plane where the first image locates to the viewpoint;
    a viewpoint distance (L) from a point at which the viewpoint projects on the plane where the first image locates to a viewpoint-facing end (A) of the first image;
    a viewing angle ($\theta_0$) at the viewpoint-facing end (A) of the first image;
    a viewing angle ($\theta_4$) at an opposite end (E) of the first image;
    a length of line-of-sight from the viewpoint to the viewpoint-facing end (A) of the first image;
    a length of line-of-sight from the viewpoint to the opposite end (E) of the first image; and
    a viewpoint angle ($\angle AOE$) for the first image.

8. A computer-readable memory comprising computer-readable instructions, wherein the instructions, when executed on a computer, cause the computer to perform the method of claim 1.

9. An image correction method, comprising:
    providing a first image;
    providing viewpoint information about a viewpoint which observes the first image;
    dividing the first image into two or more segmented images along a horizontal direction of the first image; and
    providing a second image converted from the first image by converting each of the two or more segmented images based on the viewpoint information and vertical lengths of each of the segmented images,
    wherein providing the second image converted from the first image comprises:
        obtaining a viewpoint angle for each of the segmented images based on the viewpoint information and the vertical lengths of each of the segmented images; and
        obtaining a conversion length for each segmented image from the viewpoint angles.

10. The image correction method of claim 9, wherein obtaining the conversion length for each segmented image from the viewpoint angles comprises:
    obtaining a conversion length $y_i$ of the $i^{th}$ segmented image using a conversion equation below;

$$y_i = \frac{H}{\tan\left(\theta_0 - \sum_{j=1}^{i} \alpha_j\right)} - \left(L + \sum_{j=1}^{i-1} y_j\right),$$

and
wherein H is a viewpoint height from a plane where the first image locates to the viewpoint, and L is a viewpoint distance from a point at which the viewpoint projects on the plane where the first image locates to a viewpoint-facing end of the first image.

11. The image correction method of claim 9, wherein obtaining the viewpoint angle for each segmented image comprises:

obtaining a viewpoint angle $\alpha_i$ for an $i^{th}$ segmented image using a conversion equation below;

$$\alpha_i = (\theta_0 - \theta_n) \times \left(\frac{a_i}{T}\right),$$

and
wherein T is an entire length of the first image, n is the total number of the segmented images, $a_i$ is a vertical length of the $i^{th}$ segmented image, $\theta_0$ is a viewing angle at a viewpoint-facing end of a first segmented image, and $\theta_n$ is a viewing angle at an opposite end of an $n^{th}$ segmented image.

12. The image correction method of claim 9, wherein the viewpoint information comprises information that can specify a position of the viewpoint with respect to the first image.

13. The image correction method of claim 12, wherein the viewpoint information comprises at least two of:

viewpoint height (H) from a plane where the first image locates to the viewpoint;

a viewpoint distance (L) from a point at which the viewpoint projects on the plane where the first image locates to a viewpoint-facing end (A) of the first image;

a viewing angle ($\theta_0$) at the viewpoint-facing end (A) of the first image; and a viewing angle ($\theta_4$) at an opposite end (E) of the first image.

14. A computer-readable memory comprising computer-readable instructions, wherein the instructions, when executed on a computer, cause the computer to perform the method of claim 9.

* * * * *